(12) United States Patent
Kumar et al.

(10) Patent No.: US 9,646,055 B2
(45) Date of Patent: May 9, 2017

(54) BLENDING SEARCH RESULTS ON ONLINE SOCIAL NETWORKS

(71) Applicant: Facebook, Inc., Menlo Park, CA (US)

(72) Inventors: Girish Kumar, Palo Alto, CA (US);
Yuval Kesten, San Francisco, CA (US);
Xiao Li, Sunnyvale, CA (US); Fabio Lopiano, London (GB)

(73) Assignee: Facebook, Inc., Menlo Park, CA (US)

( * ) Notice: Subject to any disclaimer, the term of this patent is extended or adjusted under 35 U.S.C. 154(b) by 204 days.

(21) Appl. No.: 14/244,748

(22) Filed: Apr. 3, 2014

(65) Prior Publication Data
US 2015/0286643 A1    Oct. 8, 2015

(51) Int. Cl.
*G06F 17/30*    (2006.01)

(52) U.S. Cl.
CPC .... *G06F 17/3053* (2013.01); *G06F 17/30424* (2013.01); *G06F 17/30672* (2013.01)

(58) Field of Classification Search
CPC ................................................ G06F 17/30424
See application file for complete search history.

(56) References Cited

U.S. PATENT DOCUMENTS

| | | | |
|---|---|---|---|
| 6,539,232 B2 | 3/2003 | Hendrey |
| 6,957,184 B2 | 10/2005 | Schmid |
| 7,539,697 B1 | 5/2009 | Akella |
| 7,752,326 B2 | 7/2010 | Smit |
| 7,836,044 B2 | 11/2010 | Kamvar |
| 8,027,990 B1 | 9/2011 | Mysen |
| 8,060,639 B2 | 11/2011 | Smit |
| 8,112,529 B2 | 2/2012 | Smit |
| 8,180,804 B1 | 5/2012 | Narayanan |
| 8,185,558 B1 | 5/2012 | Narayanan |
| 8,239,364 B2 | 8/2012 | Wable |
| 8,244,848 B1 | 8/2012 | Narayanan |
| 8,271,471 B1 | 9/2012 | Kamvar |
| 8,271,546 B2 | 9/2012 | Gibbs |

(Continued)

FOREIGN PATENT DOCUMENTS

WO    02-056196 A2    7/2002

OTHER PUBLICATIONS

International Search Report and Written Opinion for International Application PCT/US2014/032921, Jan. 9, 2015.

*Primary Examiner* — Khanh Pham
(74) *Attorney, Agent, or Firm* — Baker Botts L.L.P.

(57) ABSTRACT

In one embodiment, a method includes receiving from a first user of an online social network a search query input including one or more n-grams; generating a number of query commands based on the search query input; and searching one or more verticals to identify one or more objects stored by the vertical that match the query commands. Each vertical stores one or more objects associated with the online social network. The method also includes generating a number of search-result modules. Each search-result module corresponds to a query command of the number of query commands. Each search-result module includes references to one or more of the identified objects matching the query command corresponding to the search-result module. The method also includes scoring the search-result modules; and sending each search-result module having a score greater than a threshold score to the first user for display.

19 Claims, 13 Drawing Sheets

(56) References Cited

U.S. PATENT DOCUMENTS

| | | |
|---|---|---|
| 8,321,364 B1 | 11/2012 | Gharpure |
| 8,364,709 B1 | 1/2013 | Das |
| 8,386,465 B2 | 2/2013 | Ansari |
| 8,407,200 B2 | 3/2013 | Wable |
| 8,412,749 B2 | 4/2013 | Fortuna |
| 8,538,960 B2 | 9/2013 | Wong |
| 8,572,129 B1 | 10/2013 | Lee |
| 8,595,297 B2 | 11/2013 | Marcucci |
| 8,601,027 B2 | 12/2013 | Behforooz |
| 8,930,340 B1 * | 1/2015 | Sobol ............... G06F 17/30716 707/706 |
| 2002/0196273 A1 | 12/2002 | Krause |
| 2003/0154194 A1 | 8/2003 | Jonas |
| 2003/0208474 A1 | 11/2003 | Soulanille |
| 2004/0088325 A1 | 5/2004 | Elder |
| 2004/0255237 A1 | 12/2004 | Tong |
| 2005/0131872 A1 | 6/2005 | Calbucci |
| 2005/0171955 A1 | 8/2005 | Hull |
| 2006/0136419 A1 | 6/2006 | Brydon |
| 2007/0277100 A1 | 11/2007 | Sheha |
| 2008/0270615 A1 | 10/2008 | Centola |
| 2009/0006543 A1 | 1/2009 | Smit |
| 2009/0049014 A1 | 2/2009 | Steinberg |
| 2009/0164929 A1 | 6/2009 | Chen |
| 2009/0197681 A1 | 8/2009 | Krishnamoorthy |
| 2009/0228296 A1 | 9/2009 | Ismalon |
| 2009/0281988 A1 | 11/2009 | Yoo |
| 2009/0299963 A1 | 12/2009 | Pippuri |
| 2010/0235354 A1 | 9/2010 | Gargaro |
| 2011/0078166 A1 | 3/2011 | Oliver |
| 2011/0087534 A1 | 4/2011 | Strebinger |
| 2011/0196855 A1 | 8/2011 | Wable |
| 2011/0264648 A1 * | 10/2011 | Gulik ................ G06F 17/30867 707/722 |
| 2012/0136852 A1 | 5/2012 | Geller |
| 2012/0166432 A1 | 6/2012 | Tseng |
| 2012/0179637 A1 | 7/2012 | Juan |
| 2012/0185486 A1 | 7/2012 | Voigt |
| 2012/0221581 A1 | 8/2012 | Narayanan |
| 2012/0271831 A1 | 10/2012 | Narayanan |
| 2012/0278127 A1 | 11/2012 | Kirakosyan |
| 2012/0284329 A1 | 11/2012 | van den Oord |
| 2012/0311034 A1 | 12/2012 | Goldband |
| 2013/0031106 A1 | 1/2013 | Schechter |
| 2013/0041876 A1 | 2/2013 | Dow |
| 2013/0066876 A1 | 3/2013 | Raskino |
| 2013/0086057 A1 | 4/2013 | Harrington |
| 2013/0110827 A1 * | 5/2013 | Nabar .................... G06Q 10/00 707/728 |
| 2013/0124538 A1 | 5/2013 | Lee |
| 2013/0124542 A1 | 5/2013 | Lee |
| 2013/0144899 A1 | 6/2013 | Lee |
| 2013/0191372 A1 | 7/2013 | Lee |
| 2013/0191416 A1 | 7/2013 | Lee |
| 2013/0212089 A1 | 8/2013 | Lederer |
| 2013/0282486 A1 | 10/2013 | Rahle |
| 2014/0032587 A1 * | 1/2014 | Sankar ............. G06F 17/30389 707/759 |
| 2014/0040244 A1 * | 2/2014 | Rubinstein ........ G06F 17/30528 707/722 |
| 2015/0169571 A1 * | 6/2015 | Farago ............... G06F 17/3053 707/723 |
| 2015/0310100 A1 * | 10/2015 | Bursey ............. G06F 17/30864 707/706 |

\* cited by examiner

FIG. 5

Search: putin

All Results | Posted By | Time | Location

Top Links — See More

- A Plea for Caution From Russia — What Putin has to say about Syria — 514
  The New York Times
- Russians read Putin's Op-Ed — 514
  The New Yorker
- Barack Obama's Answer to Putin's Op-Ed — 514
  Huffington Post

Politican
Vladimir Vladimirovich Putin born 7 October 1952) is the President of Russia, a position he has held since 7 May 2012. He previously served...
122,345 like this | Like
Read More

Vladimir Putin — Community – 32,000 Likes
Cluc Radler – Putin Plecati — App – 500+ Monthly Users
See more results Related Searches
○ putin obama

510

The Skeptical Libertarian
The gushing over Vladimir Putin I've witnessed among libertarians in the last couple of day has been stomach turning. Being anti-American, internationally, does not automatically make someone a friend of peace or freedom. Putin is playing a bad hand to save his fellow murderous dictator, nothing more. We can be thankful his evil goals thwarted our president's misguided ones, but please, spare me the canonization of tyrants.

BLENDING SEARCH RESULTS ON ONLINE SOCIAL NETWORKS

TECHNICAL FIELD

This disclosure generally relates to social graphs and performing searches for objects within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, a user of a social-networking system may search for objects associated with the system using a search queries.

In particular embodiments, in response to a search query input received from a user, the social-networking system may access one or more verticals to search for objects that match the character string of the search query input. Based on the identified objects, the social-networking system may then send references to those objects for display to the user, for example in a drop-down menu associated with the query field. The querying user may then select among the references to indicate that the object corresponding to the reference should be retrieved by the social-networking system.

In particular embodiments, the social-networking system may receive an unstructured text query from a client system of a user. The text query may be processed by a sub-request generator of the social-networking system that generates a plurality of queries. The queries generated by the sub-request generator may include one or more keyword searches based on the text query, and/or one or more structured queries comprising references to particular social-graph elements. As an example and not by way of limitation, unstructured text query "photos friends" may yield a keyword query of "photos friend" and structured queries for "Photos of my Friends" and "Photos by my Friends" (which comprise references to particular social-graph elements). The sub-request generator may associate a particular score or weighting to each generated query denoting the relative importance or relevance of the query.

In particular embodiments, the queries generated by the sub-request generator may be sent to one or more data stores associated with the social-networking system to retrieve search results that match the search queries, and each search result may be returned with an associated relevance score. The search results returned by the different verticals may then be aggregated by a "blender," which may score and rank the modules. The score of a module may be based on the individual scores of the results in the particular module. The score of a module may also be based on the intent/class of the query.

BRIEF DESCRIPTION OF THE DRAWINGS

FIGS. 5-6 illustrate an example search results page of an online social network.

DESCRIPTION OF EXAMPLE EMBODIMENTS

System Overview

Figure 1:
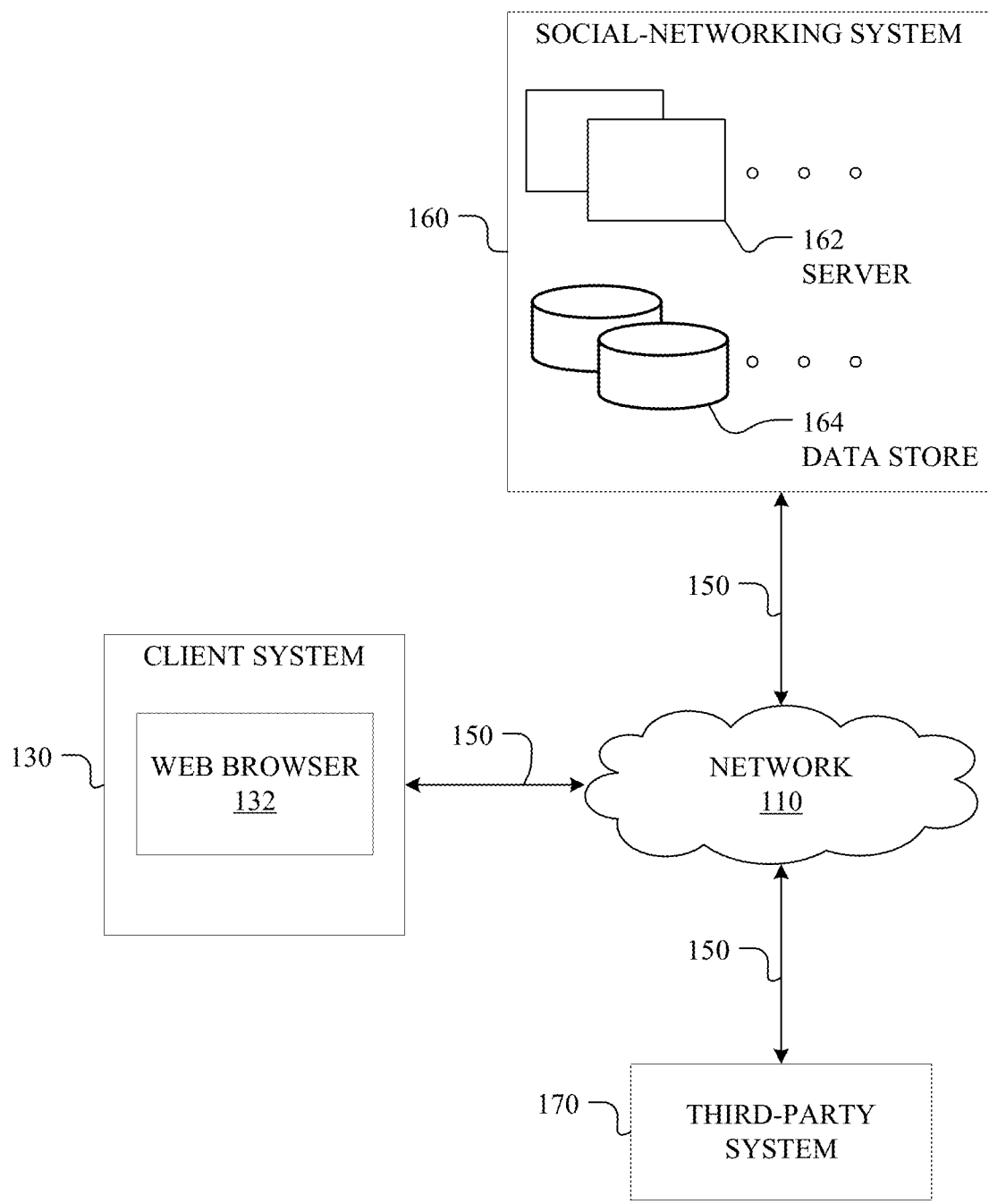
FIG. 1 illustrates an example network environment associated with a social-networking system.

FIG. 1 illustrates an example network environment 100 associated with a social-networking system. Network environment 100 includes client system 130, social-networking system 160, and third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. Client system 130 may enable a network user at client system 130 to access network 110. Client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 164 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable client system 130, social-networking system 160, or third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (i.e., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, third-party system 170 may include a third-party content object provider. A third-party content object provider may include one or more sources of content objects, which may be communicated to client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, ad-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content objects (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to client system 130. Information may be pushed to client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in or opt out of having their actions logged by social-networking system 160 or shared with other systems (e.g., third-party system 170), such as, for example, by setting appropriate privacy settings. Third-party-content-object stores may be used to store content objects received from third parties, such as third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
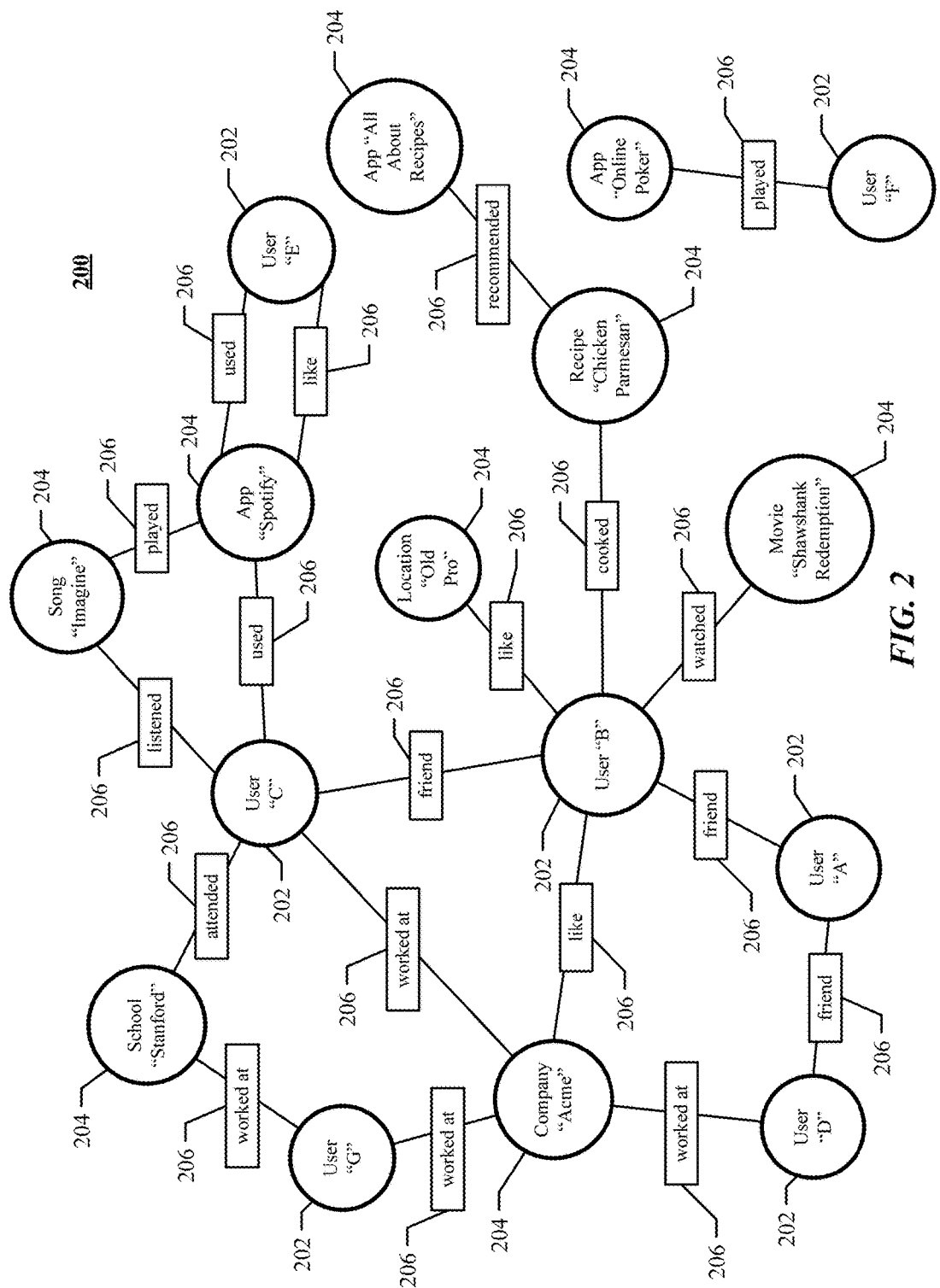
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing client system 130 to send to social-networking system 160 a message indicating the user's action. In response to the message, social-networking system 160 may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 24. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Indexing Based on Object-Type

Figure 3:
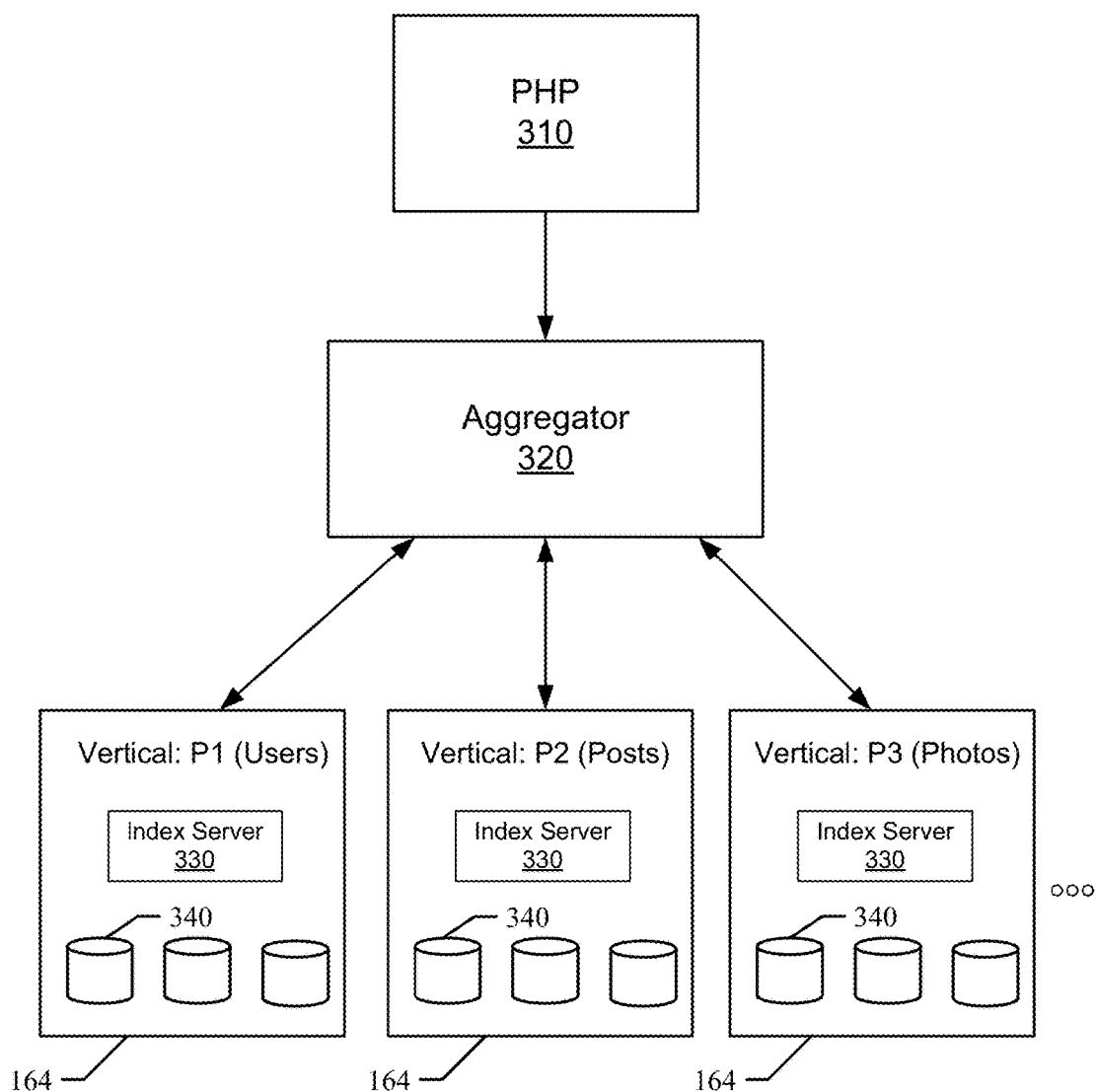
FIG. 3 illustrates an example partitioning for storing objects of a social-networking system.

FIG. 3 illustrates an example partitioning for storing objects of social-networking system 160. A plurality of data stores 164 (which may also be called "verticals") may store objects of social-networking system 160. The amount of data (e.g., data for a social graph 200) stored in the data stores may be very large. As an example and not by way of limitation, a social graph used by Facebook, Inc. of Menlo Park, Calif. can have a number of nodes in the order of $10^8$, and a number of edges in the order of $10^{10}$. Typically, a large collection of data such as a large database may be divided into a number of partitions. As the index for each partition of a database is smaller than the index for the overall database, the partitioning may improve performance in accessing the database. As the partitions may be distributed over a large number of servers, the partitioning may also improve performance and reliability in accessing the database. Ordinarily, a database may be partitioned by storing rows (or columns) of the database separately. In particular embodiments, a database may be partitioned by based on object-types. Data objects may be stored in a plurality of partitions, each partition holding data objects of a single object-type. In particular embodiments, social-networking system 160 may retrieve search results in response to a search query by submitting the search query to a particular partition storing objects of the same object-type as the search query's expected results. Although this disclosure describes storing objects in a particular manner, this disclosure contemplates storing objects in any suitable manner.

In particular embodiments, each object may correspond to a particular node of a social graph 200. An edge 206 connecting the particular node and another node may indicate a relationship between objects corresponding to these nodes. In addition to storing objects, a particular data store may also store social-graph information relating to the object. Alternatively, social-graph information about particular objects may be stored in a different data store from the objects. Social-networking system 160 may update the search index of the data store based on newly received objects, and relationships associated with the received objects.

In particular embodiments, each data store 164 may be configured to store objects of a particular one of a plurality of object-types in respective data storage devices 340. An object-type may be, for example, a user, a photo, a post, a comment, a message, an event listing, a webpage, an application, a location, a user-profile page, a concept-profile page, a user group, an audio file, a video, an offer/coupon, or another suitable type of object. Although this disclosure describes particular types of objects, this disclosure contemplates any suitable types of objects. As an example and not by way of limitation, a user vertical P1 illustrated in FIG. 3 may store user objects. Each user object stored in the user vertical P1 may comprise an identifier (e.g., a character string), a user name, and a profile picture for a user of the online social network. Social-networking system 160 may also store in the user vertical P1 information associated with a user object such as language, location, education, contact information, interests, relationship status, a list of friends/contacts, a list of family members, privacy settings, and so on. As an example and not by way of limitation, a post vertical P2 illustrated in FIG. 3 may store post objects. Each post object stored in the post vertical P2 may comprise an identifier, a text string for a post posted to social-networking system 160. Social-networking system 160 may also store in the post vertical P2 information associated with a post object such as a time stamp, an author, privacy settings, users who like the post, a count of likes, comments, a count of comments, location, and so on. As an example and not by way of limitation, a photo vertical P3 may store photo objects (or objects of other media types such as video or audio). Each photo object stored in the photo vertical P3 may comprise an identifier and a photo. Social-networking system 160 may also store in the photo vertical P3 information associated with a photo object such as a time stamp, an author, privacy settings, users who are tagged in the photo, users who like the photo, comments, and so on. In particular embodiments, each data store may also be configured to store information associated with each stored object in data storage devices 340.

In particular embodiments, objects stored in each vertical 164 may be indexed by one or more search indices. The search indices may be hosted by respective index server 330 comprising one or more computing devices (e.g., servers). The index server 330 may update the search indices based on data (e.g., a photo and information associated with a photo) submitted to social-networking system 160 by users or other processes of social-networking system 160 (or a third-party system). The index server 330 may also update the search indices periodically (e.g., every 24 hours). The index server 330 may receive a query comprising a search term, and access and retrieve search results from one or more search indices corresponding to the search term. In some embodiments, a vertical corresponding to a particular object-type may comprise a plurality of physical or logical partitions, each comprising respective search indices.

In particular embodiments, social-networking system 160 may receive a search query from a PHP (Hypertext Preprocessor) process 310. The PHP process 310 may comprise one or more computing processes hosted by one or more servers 162 of social-networking system 160. The search query may be a text string or a search query submitted to the PHP process by a user or another process of social-networking system 160 (or third-party system 170).

More information on indexes and search queries may be found in U.S. patent application Ser. No. 13/560,212, filed 27 Jul. 2012, U.S. patent application Ser. No. 13/560,901, filed 27 Jul. 2012, and U.S. patent application Ser. No. 13/723,861, filed 21 Dec. 2012, each of which is incorporated by reference.

Typeahead and Search Queries

In particular embodiments, one or more client-side and/or backend (server-side) processes may implement and utilize a "typeahead" feature that may automatically attempt to match social-graph elements (e.g., user nodes 202, concept nodes 204, or edges 206) to information currently being entered by a user in an input form rendered in conjunction with a requested webpage (such as, for example, a user-profile page, a concept-profile page, a search-results webpage, or another suitable page of the online social network), which may be hosted by or accessible in social-networking system 160. In particular embodiments, as a user is entering text to make a declaration, the typeahead feature may attempt to match the string of textual characters being entered in the declaration to strings of characters (e.g., names, descriptions) corresponding to user, concepts, or edges and their corresponding elements in the social graph 200. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element. More information on typeahead processes may be found in U.S. patent application Ser. No. 12/763,162, filed 19 Apr. 2010, and U.S. patent application Ser. No. 13/556,072, filed 23 Jul. 2012, each of which is incorporated by reference.

Figure 4:
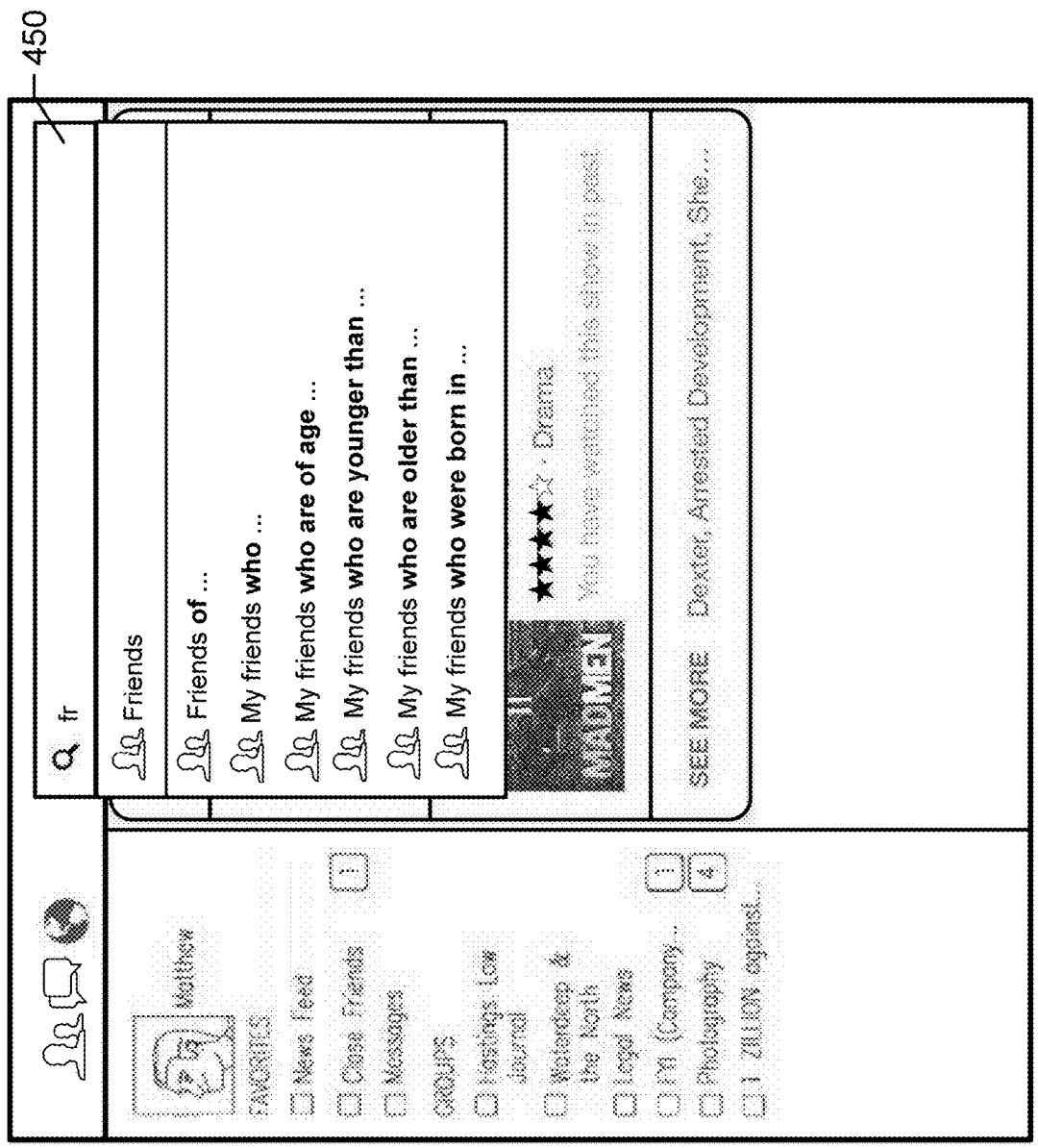
FIG. 4 illustrates an example webpage of an online social network.

FIG. 4 illustrates an example webpage of an online social network. In particular embodiments, a user may submit a query to the social-network system 160 by inputting text into query field 450. A user of an online social network may search for particular content objects (hereinafter "objects") or content-object-types (hereinafter "object-types") associated with the online social network (e.g., users, concepts, webpages, external content or resources) by providing a short phrase describing the object or object-type, often referred to as a "search query," to a search engine. The query may be a text query and may comprise one or more character strings (which may include one or more n-grams). In general, a user may input any character string comprising one or more characters into query field 450 to search for objects on social-networking system 160 that substantially matches the character string. Social-networking system 160 may then search one or more verticals 164 to identify objects matching the query. The search engine may conduct a search based on the query using various search algorithms and generate search results that identify objects (e.g., user-profile pages, content-profile pages, or external resources) that are most likely to be related to the search query. To conduct a search, a user may input or send a search query to the search engine. In response, the search engine may identify one or more resources that are likely to be related to the search query, each of which may individually be referred to as a "search result," or collectively be referred to as the "search results" corresponding to the search query. The identified objects may include, for example, social-graph elements (i.e., user nodes 202, concept nodes 204, edges 206), profile pages, external webpages, or any combination thereof. Social-networking system 160 may then generate a search-results webpage with search results corresponding to the identified objects and send the search-results webpage to the user. In particular embodiments, the search engine may limit its search to objects associated with the online social network. However, in particular embodiments, the search engine may also search for objects associated with other sources, such as third-party system 170, the internet or World Wide Web, or other suitable sources. Although this disclosure describes querying social-networking system 160 in a particular manner, this disclosure contemplates querying social-networking system 160 in any suitable manner.

In connection with search queries and search results, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/732,101, filed 31 Dec. 2012, each of which is incorporated by reference.

Rewriting Queries and Generating Query Commands

In particular embodiments, social-networking system 160 may generate a query command based on a query (e.g., a text query or a structured query) received from a querying user. The query command may then be used in a search against objects in a data store 164 of the social-networking system 160. In particular embodiments, the query command may be provided for a search using search indices for one or more data stores or verticals of social-networking system 160. The query command may comprise one or more query constraints. Each query constraint may be identified by social-networking system 160 based on a parsing of the query by a parsing algorithm. Each query constraint may be a request for a particular object-type. In particular embodiments, the query command may comprise query constraints in symbolic expression or s-expression. Social-networking system 160 may parse the structured query "Photos I like" to a query command (photos_liked_by:<me>). The query command (photos_liked_by: <me>) denotes a query for photos liked by a user (i.e., <me>, which corresponding to the querying user), with a single result-type of photo. The query constraint may include, for example, social-graph constraints (e.g., requests for particular nodes or nodes-types, or requests for nodes connected to particular edges or edge-types), object constraints (e.g., request for particular objects or object-types), location constraints (e.g., requests for objects or social-graph entities associates with particular geographic locations), other suitable constraints, or any combination thereof. In particular embodiments, a query command may comprise prefix and an object. The object may correspond to a particular node in the social graph 200, while the prefix may correspond to a particular edge 206 or edge-type (indicating a particular type of relationship) connecting to the particular node in the social graph 200. As an example and not by way of limitation, the query command (pages_liked_by:<user>) comprises a prefix pages_liked_by, and an object <user>. Although this disclosure describes generating particular query commands in a particular manner, this disclosure contemplates generating any suitable query commands in any suitable manner. In particular embodiments, social-networking system 160 may generate a query command comprising a "weak and" (WAND) or "strong or" operator (SOR). More information on WAND and SOR operators may be found in U.S. patent application Ser. No. 13/560,901, filed 27 Jul. 2012, and U.S. patent application Ser. No. 13/887,049, filed 3 May 2013, which are incorporated by reference.

In particular embodiments, the parsing algorithm used to generate query commands may comprise one or more parsing-configuration parameters. The parsing-configuration parameters may specify how to generate a query command for a particular type of query received from a user. The parsing-configuration parameters may specify, for example, instructions for generating query commands having a specified number of query constraints for a specified number of objects of a specified object-type to be retrieved from a specified number of data stores 164. In other words, the parsing-configuration parameters may specify the types of objects that should be searched and the types/number of verticals 164 that should be accessed. For each vertical 164 accessed, the parsing-configuration parameters may specify the number of objects to retrieve from each vertical 164. As an example and not by way of limitation, in response to a search query input "kais", social-networking system 160 may generate the following query command:

(AND (name: "kais")
(OR friends_of: (friends_of: <me>): num_to_score: 50)
(OR pages: < >: num_to_score: 25)).

This query command contains a first query constraint (OR friends_of: (friends_of: <me>): num_to_score: 50), which instructs social-networking system 160 to access a users vertical 164 to search for users that are friends-of-friends_of the querying user that match the character string "kais", and to retrieve the top fifty results. The second query constraint, (OR pages: < >: num_to_score: 25), instructs social-networking system 160 to access a webpages vertical 164 to search for pages that match the character string "kais" and to retrieve the top twenty-five results. However, this process may be inefficient if social-networking system 160 has to retrieve an excess of objects of particular object-types in order to generate a sufficient number of search results. In order to improve the amount of processing (CPU) power consumed when processing queries, social-networking system 160 may use parsing-configuration parameters that minimize the number of object-types and the number of objects retrieved from each vertical 164, while still retrieving a sufficient number of object to retrieve the top-N scoring objects. As an example and not by way of limitation, continuing with the prior example, in order to generate the top-10 search results, social-networking system 160 may only need to retrieve the top twenty-five friends-of-friends and the top fifteen pages. This may be because, for example, the friends-of-friends ranked twenty-six to fifty all have final-scores that put them outside of the top-10 search results. Thus, fewer users need to be pulled in order to maintain the same quality of search results. This allows the processing power consumed by each search query. The parsing-configuration parameters may be revised so that more or less object-types (and possibly additional verticals 164) are searched, or that more or less objects of each object-type are retrieved. Although this disclosure describes generating particular query commands in a particular manner, this disclosure contemplates generating any suitable query commands in any suitable manner.

In particular embodiments, social-networking system 160 may retrieve objects from one or more verticals 164 that substantially match the query constraints of a query command. Social-networking system 160 may access one or more verticals 164 in response to a search query received from a user, as specified by the query command. Each vertical 164 may store one or more objects associated with the online social network. The number and type of verticals 164 accessed in response to the search query may be based on the query constraints of the query command. Each vertical 164 may store objects associated with the online social network of the object-type specified by the query constraint. As an example and not by way of limitation, one of the query constraints of a query command for users, social-networking system 160 may access a users vertical P1 to identify one or more users who match the query. Social-networking system 160 may identify matching objects in any suitable manner, such as, for example, by using one or more string matching algorithms to match the character string with a string of characters associated with each of one or more of the objects. As an example and not by way of limitation, in response to a search query input "kais", social-networking system 160 may access one or more users verticals P1 and one or more posts verticals P2 and search the accessed verticals to identify objects (e.g., user-profile pages or posts) stored in those verticals. Social-networking system 160 may submit the following query command to each accessed vertical:

(AND (name: "kais")
(OR friends_of: (friends_of: <me>): num_to_score: 50)
(OR pages: < >: num_to_score: 25)).

Social-networking system 160 may access the index servers 330 of each vertical 164, causing index server 330 to return results that match the query command. As an example and not by way of limitation, social-networking system 160 may access index server 330 of a users vertical P1, causing index server 330 to identify users <Kaisen L>, <Nathen Kaiser>, <Catie Kaiser>, and <Alex Kaiser> (each represented by an user identifier). That is, users <Kaisen L>, <Nathen Kaiser>, <Catie Kaiser>, and <Alex Kaiser> may have a name matching "kais". Furthermore, each of these identified users matches the query constraint (friends_of: (friends_of: <me>)), which request objects corresponding to user that are friend-of-friends of the querying user. Social-networking system 160 may also access index server 330 of a posts vertical P2, causing index server 330 to identify the posts referencing the band <Kaiser Chiefs>. That is, the band <Kaiser Chiefs> has a name matching "kais". Furthermore, the identified post matches the query constraint (posts: < >), which request objects corresponding to posts. In particular embodiments, social-networking system 160 may identify objects matching a query command by traversing the social graph 200 from the particular node along the particular connecting edges 206 (or edge-types) to nodes corresponding to objects specified by query command in order to identify one or more search results. As an example and not by way of limitation, the query command (pages_liked_by: <user>) may be executed by social-networking system 160 by traversing the social graph 200 from a user node 202 corresponding to <user> along like-type edges 206 to concept nodes 204 corresponding to pages liked by <user>. Although this disclosure describes searching for objects in a particular manner, this disclosure contemplates searching for objects in any suitable manner.

In particular embodiments, when searching verticals 164 to identify matching objects, social-networking system 160 may only identify and score up to a threshold number of matching nodes in a particular vertical 164. When social-networking system 160 retrieves objects from a vertical 164 in response to a query (or a particular query constraint), the objects may be retrieved based on a static-score or static-rank of the indexed objects. As an example and not by way of limitation, the objects with the static-ranks, up to the threshold number, may be retrieved and further processed, for example, by a scoring algorithm that may calculate a final-score for the retrieved objects based on a variety of factors in order to determine search results to send back to the querying user. Each object stored in a vertical 164 may be associated with a pre-determined static-score based on a static-scoring algorithm. In particular embodiments, the pre-determined static-score of each object may a pre-determined ranking of the object for a particular type of query. As an example and not by way of limitation, when a structured query comprises "friends of Alex" (which may be a portion of a larger query, such as, "photos of friends of Alex", or "friends of friends of Alex"), user nodes 202 corresponding to friends of the user "Alex" may have pre-determined static-scores with respect to this structured query. Alex's top-three friends may be, for example, "Larry", "Moe," and "Joe", ranked in that order. Thus, when searching a users vertical P1 in response to the query "friends of Alex" (or the query command friends_of:<Alex>), the users "Larry", "Moe," and "Joe" may be retrieved as the top-three objects. When searching a vertical 164, social-networking system 160 may retrieve objects based on the static-scores of the objects, where the objects with the highest/best static-scores may be retrieved. The threshold number of matching objects may then be scored and ranked by the social-networking system 160. The threshold number may be chosen to enhance search quality or to optimize the processing of search results. As an example and not by way of limitation, social-networking system 160 may only identify the top-N matching objects (i.e., the number to score, or "num_to_score" for an s-expression in the examples used herein) in a users vertical P1 in response to a query command requesting users. The top-N objects may be determined by their static-scores (e.g., ranking based on the current social-graph affinity of the user with respect to the querying user) of the objects in a search index corresponding to the users vertical P1. The static-scores may be pre-determined by social-networking system 160 using a static-scoring algorithm. However, this process may be inefficient if social-networking system 160 has to retrieve an excess number of objects from a vertical 164 in order to find the top-N scoring objects according the scoring algorithm that determines which objects to send back to a user as search results. As an example and not by way of limitation, social-networking system 160 may access a particular vertical 164 in response to a query and retrieves one-hundred matching objects, where each object has an associated static-rank. A final-score may then be calculated for these one-hundred objects (e.g., based on social-graph affinity) by a scoring algorithm. The top-5 scoring objects according to the scoring-algorithm may be, for example, objects having a static-rank of 4, 12, 20, 78, and 95. This process could be improved, for example, if the top-N objects static-rank were the same as the top-N objects by final-rank. By more closely aligning the static-rank of object with the final-ranks calculated by the search engine, social-networking system may be able to reduce the number of matching objects it needs to retrieve and score in order to generate a sufficient number of search results. In particular embodiments, the static-score of an object may be based on the search query itself. In other words, depending on the particular query or query-type, an object may have a different static-score with respect to that query or query-type. As an example and not by way of limitation, if the number to score is 500, the top 500 objects may be identified. These 500 objects may then be scores based on one or more factors (e.g., match to the search query or other query constraints, social-graph affinity, search history, etc.), and the top M results may then be generated as search results to display to the querying user. In particular embodiments, the top results after one or more rounds of rankings may be sent to an aggregator 320 for a final round of ranking, where identified objects may be reordered, redundant results may be dropped, or any other type of results-processing may occur before presentation to the querying user. Although this disclosure describes identifying particular numbers of objects, this disclosure contemplates identifying any suitable numbers of objects. Furthermore, although this disclosure describes ranking objects in a particular manner, this disclosure contemplates ranking objects in any suitable manner.

In particular embodiments, social-networking system 160 may score one or more objects identified as matching a query constraint. The score (also referred to as a final-score) for each retrieved/identified object may be calculated in any suitable manner, such as, for example, by using a particular scoring algorithm. Each identified object may correspond to a particular user node 202 or concept node 204 of social graph 200. When a query command includes a plurality of query constraints, social-networking system 160 may score the nodes matching each query constraint independently or jointly. Social-networking system 160 may score the first set of identified nodes by accessing a data store 164 corresponding to the object-type of the identified nodes. As an example and not by way of limitation, when generating identified nodes matching the query constraint (extract authors: (term posts_liked_by: <Mark>)), social-networking system 160 may identify the set of users (<Tom>, <Dick>, <Harry>) in the user vertical 164. Social-networking system 160 may then score the users <Tom>, <Dick>, and <Harry> based on their respective social-affinity with respect to the user <Mark>. For example, social-networking system 160 of the post vertical 164 may then score the identified nodes of users <Tom>, <Dick>, and <Harry> based on a number of posts in the list of posts liked by the user <Mark>. The users <Tom>, <Dick>, and <Harry> may have authored the following posts liked by the user <Mark>: <post 1>, <post 2>, <post 3>, <post 4>, <post 5>, <post 6>. If user <Dick> authored posts <post 1>, <post 2>, <post 3>, user <Tom> authored posts <post 5> and <post 6>, and user <Harry> authored post <post 4>, social-networking system 160 may score user <Dick> as highest since his authored most of the posts in the list of posts liked by the user <Mark>, with <Tom> and <Harry> having consecutively lower scores. As another example and not by way of limitation, using the prior example, social-networking system 160 may access a forward index that maps a post to a count of likes of the post. The index server may access the forward index and retrieve counts of likes for each post of the list of posts liked by the user <Mark>. The index server may score the posts in the list of posts (i.e., <post 1>, <post 2>, <post 3>, <post 4>, <post 5>, <post 6>) based on respective counts of likes, and return to social-networking system 160 authors of top scored posts (e.g., top 3 scored or most liked posts) as the first identified node. After each appropriate scoring factor is considered for a particular identified node, an overall score for the identified node may be determined. Based on the scoring of the nodes, social-networking system 160 may then generate one or more sets of identified nodes. As an example and not by way of limitation, social-networking system 160 may only generate a set of identified nodes corresponding to nodes having a score greater than a threshold score. As another example and not by way of limitation, social-networking system 160 may rank the scored nodes and then only generate a set of identified nodes corresponding to nodes having a rank greater than a threshold rank (e.g., top ten, top twenty, etc.). Although this disclosure describes scoring matching nodes in a particular manner, this disclosure contemplates scoring matching nodes in any suitable manner.

In particular embodiments, social-networking system 160 may score the search results based on a social-graph affinity associated with the querying user (or the user node 202 of the querying user). The scoring algorithm used to score retrieved object may use social-graph affinity as a factor. Social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In particular embodiments, social-graph affinity may be used as a factor when scoring search results. As an example and not by way of limitation, in response to the structured query "Photos of my friends", social-networking system 160 may generate the query command (photos_of(users:<friends>)), and may determine that the search intent of this query is to view group photos showing the user's friends. When scoring identified concept nodes 204 corresponding to photos with the user's friends tagged in the photo, social-networking system 160 may score photos better based on the querying user's respective social-graph affinity (e.g., as measured by an affinity coefficient) of the user's tagged in the photo with respect to the querying user. Furthermore, photos showing more of the querying user's friends may be tagged higher than photos showing fewer of the user's friends, since having more friends tagged in the photo may increase the querying user's affinity with respect to that particular photo. Although this disclosure describes scoring search results based on affinity in a particular manner, this disclosure contemplates scoring search results based on affinity in any suitable manner. Furthermore, in connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, field 1 Oct. 2012, each of which is incorporated by reference.

In particular embodiments, social-networking system 160 may determine one or more revised static-scores for one or more of the retrieved objects based on a comparison of the final-scores and the static-scores of the retrieved objects. The static-scores associated with indexed object may be improved by revising the static-scores based on experiments run using archived search queries. The archived queries can be parsed to generate query commands, which can be submitted to a vertical 164 in order to retrieve a first number of objects based on their static-scores. The retrieved objects can have their final-scores calculated. The final-scores can then be compared to the static-scores, and the static-scores can be modified so they more closely match the final-scores. This can be done for a variety of queries, so that the static-scores are optimized to match the final-scores as closely as possible for a variety of queries. In particular embodiments, social-networking system 160 may revise the static-scoring algorithm based on the revised static-scores. The static-scoring algorithm may be revised to calculate pre-determined static-scores for objects based on one or more of the revised static-scores of one or more of the retrieved objects, respectively. In particular embodiments, social-networking system 160 may revise static-scores by determining a difference between the pre-determined static-score for each object and the calculated final-score for each object. Social-networking system 160 may then revise one or more of the static-scores of one or more of the objects based on the determined differences. As an example and not by way of limitation, continuing with a previous example, if the top-5 objects by final-score according to the scoring-algorithm may be, for example, objects having a static-rank of 4, 12, 20, 78, and 95. The static-ranks of all the objects may be revised upward so that these objects have static-ranks closer to 1-to-5. Note that, theoretically the ideal static-ranks would be 1, 2, 3, 4, and 5. However, because the final-scores may be based on a variety of factors, such as social-graph affinity and user history, the ideal static-ranks with respect to a first querying user or a first query-type may be different than the ideal static-ranks with respect to a second querying user or a second query-type. Thus, the static-ranks of objects may be revised so they more closely match the final-ranks of objects with respect to a variety of users and query-types. Although this disclosure describes revising static-scoring algorithms in a particular manner, this disclosure contemplates revising static-scoring algorithms in any suitable manner.

In particular embodiments, social-networking system 160 may generate one or more revised parsing-configuration parameters based on a comparison of the final-scores of the retrieved objects and the specified number of objects of the query constraints. The parsing algorithm may be improved by revising the way query constraints are generated based on experiments run using archived search queries. The archived queries can be parsed to generate query commands, which can be submitted to one or more verticals 164 in order to retrieve a first number of objects. Social-networking system 160 may then calculate final-scores for the retrieved objects, and the final-scores may then be analyzed to determine whether the number of objects retrieved for any specified object-type can be reduced while still retrieving some or all of the top-N scoring results. In particular embodiments, social-networking system 160 may revise the parsing algorithm based on the parsing-configuration parameters such that one or more of the specified number of objects of a specified object-type is reduced based on the revised parsing-configuration parameters. As an example and not by way of limitation, for a particular query command s-expression generated by the parsing algorithm in response to a particular query, social-networking system 160 may revise the parsing-configuration parameters used to generate that query command so the specified number of objects specified by "num_to_score" is reduced while still retrieving some or all of the top-N scoring results (e.g., retrieving a sufficient number of the top-N scoring results to maintain a threshold quality of search results). If the num_to_score can be reduced, then the parsing algorithm (or particular parsing-configuration parameters) may be revised to retrieve fewer objects or object-types. The amount that num_to_score is reduced may correlated directly to processing power consumed by social-networking system 160. As these experiments are run using archived queries, social-networking system 160 may generate data of score-quality versus CPU power (or simply num_to_score), and use that data to find a point where, for particular queries or query-types, social-networking system 160 is still retrieving sufficient high-quality results (i.e., high-scoring results) while significantly reducing the power consumed. In other words, it may be worthwhile to sacrifice some search result quality if there is enough savings in processing power. In particular embodiments, social-networking system 160 may revise the parsing algorithm based on the parsing-configuration parameters such that one or more of the query constraints is removed from the query commands generated by the parsing algorithm based on the revised parsing-configuration parameters. In particular embodiments, social-networking system 160 may revise the parsing algorithm based on the parsing-configuration parameters such that one or more of the specified number of data stores 164 to access is reduced based on the revised parsing-configuration parameters. As an example and not by way of limitation, continuing with a prior example, in response to a search query input "kais", social-networking system 160 may generate the following query command:

(AND (name: "kais")
(OR friends_of: (friends_of: <me>): num_to_score: 50)
(OR pages: < >: num_to_score: 25)).

If an analysis of the final-scores of the retrieved pages from the posts vertical P2 shows that none of the retrieved pages are within the top-N results, then that entire query constraint may be removed. In other words, the parsing algorithm may be revised so that posts verticals P2 are not searched in response to this query-type. In particular embodiments, social-networking system 160 may revise the parsing algorithm based on the number of objects that need to be retrieved from the data store in order to retrieve all objects having a final-score greater than or equal to a threshold score. As an example and not by way of limitation, social-networking system may identify each retrieved object having a score (or rank) greater than or equal to a threshold score. Social-networking system 160 may then determine, for each query constraint of each query command, a number of objects that need to be retrieved from the data store to retrieve each identified object having a score greater than or equal to the threshold score. Based on the determined number of objects that need to be retrieved from the data store, social-networking system 160 may then revise one or more of the parsing-configuration parameters. Although this disclosure describes revising parsing algorithms in a particular manner, this disclosure contemplates revising parsing algorithms in any suitable manner.

Generating Search Results

In particular embodiments, in response to a query received from a querying user, social-networking system 160 may generate one or more search results, where the search results correspond to the query. Social-networking system 160 may identify objects (e.g., users, photos, profile pages (or content of profile pages), etc.) that satisfy or otherwise match the query. Each search result may correspond to a node of social graph 200. A search result corresponding to each identified object may then be generated. As an example and not by way of limitation, in response to the query "Photos of Matt and Stephanie", social-networking system 160 may identify a photo where the user's "Matt" and "Stephanie" are both tagged in the photo. A search result corresponding to this photo may then be generated and sent to the user. In particular embodiments, each search result may be associated with one or more objects, where each query constraint of the query command corresponding to the query is satisfied by one or more of the objects associated with that particular search result. As an example and not by way of limitation, continuing with the prior example, in response to the structured query "Photos of Matt and Stephanie", social-networking system 160 may parse the query to generate the query command (intersect (photos_of:<Matt>), (photos_of:<Stephanie>)), which could be executed to generate a search result corresponding to a photo where the user's "Matt" and "Stephanie" (who were both referenced in the structured query) are both tagged in the photo (i.e., their user nodes 202 are connected by tagged-in-type edges 206 to the concept node 204 corresponding to the photo). In other words, the constraints for (photos_of:<Matt>) and (photos_of:<Stephanie>) are both satisfied by the photo because it is connected to the user nodes 202 for the user's "Matt" and "Stephanie". The nodes identified as matching the query may be scored (and possibly ranked), and then one or more (e.g., a threshold number) may be generated as search result to display to the user. Although this disclosure describes generating search results in a particular manner, this disclosure contemplates generating search results in any suitable manner.

In particular embodiments, social-networking system 160 may send one or more search results to the querying user. The search results may be sent to the user, for example, in the form of a list of links on the search-results webpage, each link being associated with a different webpage that contains some of the identified resources or content. In particular embodiments, each link in the search results may be in the form of a Uniform Resource Locator (URL) that specifies where the corresponding webpage is located and the mechanism for retrieving it. Social-networking system 160 may then send the search-results webpage to the web browser 132 on the user's client system 130. The user may then click on the URL links or otherwise select the content from the search-results webpage to access the content from social-networking system 160 or from an external system (such as, for example, third-party system 170), as appropriate. In particular embodiments, each search result may include link to a profile page and a description or summary of the profile page (or the node corresponding to that page). The search results may be presented and sent to the querying user as a search-results page. When generating the search results, social-networking system 160 may generate one or more snippets for each search result, where the snippets are contextual information about the target of the search result (i.e., contextual information about the social-graph entity, profile page, or other content corresponding to the particular search result). In particular embodiments, social-networking system 160 may only send search results having a score/rank over a particular threshold score/rank. As an example and not by way of limitation, social-networking system 160 may only send the top ten results back to the querying user in response to a particular search query. Although this disclosure describes sending particular search results in a particular manner, this disclosure contemplates sending any suitable search results in any suitable manner.

More information on generating search results may be found in U.S. patent application Ser. No. 13/731,939, filed 31 Dec. 2012, which is incorporated by reference.

Blending Search Results

In particular embodiments, social-networking system 160 may generate one or more search-result modules 510 (hereinafter "modules") with references to related objects and interleave or "blend" the modules 510 into a set of search results 514. One or more modules 510 may be scored based at least in part on an object-type associated with module 510 and/or by determining a classification of the search query. Herein, reference to a module may refer to a grouping of objects (e.g. user profiles, posts, photos, webpages, etc.) or references to objects identified in response to a search query. As an example and not by way of limitation, identification of the objects of each module 510 may be personalized for each user. As another example and not by way of limitation, the user may interact with search results 514, such as for example navigation between the search results 514 of modules 510 through a pre-determined touch gesture. Although this disclosure describes generating and blending search results in response to a query in a particular manner, this disclosure contemplates generating and blending search results in response to a query in any suitable manner.

In particular embodiments, social-networking system 160 may receive from a first user of an online social network a search query input comprising one or more n-grams. Social-networking system 160 may parse the search query received from the user (i.e., the querying user) to identify one or more n-grams contained in the search query. As an example and not by way of limitation, the social-networking system 160 may parse the text query "friends stanford" to identify the following n-grams: friends; stanford; friends stanford. In particular embodiments, the search query input may comprise a user-generated character string received from a client system 130 associated with the first user. The user-generated character string may be entered by the first user in query field 450 and rendered at the client system 130 as each character of the character string is entered by the user. As an example and not by way of limitation, social-networking system 160 may enter an unstructured text query such as for example "photos friends" or "tom facebook" that may generate one or more structured search queries as described below. As another example and not by way of limitation, social-networking system 160 may then search data store 164 (or, in particular, a social-graph database) to identify content that matches the search query, as described below. In particular embodiments, the search query input may comprise one or more query tokens selected by the querying user. More information on generating search queries using query tokens may be found in U.S. patent application Ser. No. 14/179,357, filed 12 Feb. 2014, which is incorporated by reference. In particular embodiments, social-networking system 160 may identify, for each n-gram identified in the text query, one or more social-graph elements corresponding to the n-gram. More information on parsing text queries and identifying corresponding social-graph elements may be found in U.S. patent application Ser. No. 13/731,866, filed 31 Dec. 2012, which is incorporated by reference. A search engine may conduct a search based on the search query using various search algorithms and generate search results 514 that may identify resources or content (e.g., user-profile pages, content-profile pages, or external resources) that are most likely to be related to the suggested search query. Although this disclosure describes receiving particular search inputs in a particular manner, this disclosure contemplates receiving any suitable search inputs in any suitable manner.

In particular embodiments, social-networking system 160 may generate a plurality of query commands based on the search query input. The identified n-grams and corresponding social-graph elements may be used to generate a query command that is executable by a search engine. The query command may be a structured semantic query with defined functions that accept specific arguments. As an example and not by way of limitation, the text query "friend me mark" could be parsed to form the query command: intersect(friend (me), friend(Mark)). In other words, the query is looking for nodes in the social graph that intersect the querying user ("me") and the user "Mark" (i.e., those user nodes 202 that are connected to both the user node 202 of the querying user by a friend-type edge 206 and the user node 202 for the user "Mark" by a friend-type edge 206). In particular embodiments, a sub-request generator of the online social network may process the search query input to generate query commands that correspond to one or more keyword searches and query commands that correspond to one or more structured queries using a natural-language processor (NLP). The NLP may convert words from the language in which they were entered as a text query into the language in which a best match for one or more structured queries. As an example and not by way of limitation, for the unstructured text query "photos friends", the sub-request generator of social-networking system 160 may generate query commands corresponding to the keyword query "photos friends" (i.e., a keyword search for the terms "photos" and "friends") and query commands corresponding to the structured queries "Photos of my friends" and "Photos by my friends" (i.e., structured queries referencing the particular social-elements "Photos of" and "Photos by", which correspond to particular edge-types, and "my friends", which corresponds to particular user nodes 202). As another example and not by way of limitation, for the unstructured text query "tom facebook", the sub-request generator of social-networking system 160 may generate query commands corresponding to the keyword query "tom facebook" and query commands corresponding to structured queries "People named Tom who work at Facebook", "Friends of Tom who work at Facebook", "People named Tom who like Facebook", and "People who have worked at Facebook and TomTom". In particular embodiments, a query command may comprise one or more query constraints. Each query constraint may be identified by social-networking system 160 based on a parsing of the structured query. Each query constraint may be a request for a particular object-type. In particular embodiments, the query command may comprise query constraints in symbolic expression or s-expression. Social-networking system 160 may parse the structured query "Photos I like" to a query command (photos_liked_by: <me>). The query command (photos_liked_by: <me>) denotes a query for photos liked by a user (i.e., <me>, which corresponding to the querying user), with a single result-type of photo. The query constraint may include, for example, social-graph constraints (e.g., requests for particular nodes or nodes-types, or requests for nodes connected to particular edges or edge-types), object constraints (e.g., request for particular objects or object-types), location constraints (e.g., requests for objects or social-graph entities associates with particular geographic locations), other suitable constraints, or any combination thereof. More information on query constraints may be found in U.S. patent application Ser. No. 13/877,049, filed 3 May 2013, which is incorporated by reference. In particular embodiments, one or more of the query commands may correspond to a structured query comprising references to one or more nodes and one or more edges. As an example and not by way of limitation, social-networking system 160 may generate a query command (intersect(friends_of:<Tom>), (worked_at:<Facebook>) corresponding to the structured query "Friends of Tom who work at Facebook". As another example and not by way of limitation, the text query "friends stanford" may be parsed into the query command: intersect(school(Stanford University), friends(me)). In other words, the query is looking for nodes in the social graph that intersect both friends of the querying user ("me") (i.e., those user nodes 202 that are connected to the user node 202 of the querying user by a friend-type edge 206) and the concept node 204 for Stanford University. Although this disclosure describes generating particular query commands in a particular manner, this disclosure contemplates generating any suitable query commands in any suitable manner.

In particular embodiments, social-networking system 160 may search one or more verticals 164 (i.e., data stores) to identify one or more objects stored by the vertical 164 that match the query commands. As discussed previously, each vertical 164 may store one or more objects associated with the online social network. In particular embodiments, query commands corresponding to the keyword search and one or more structured queries are sent to verticals 164 to identify objects matching the query commands. Social-networking system 160 may then identify objects (e.g., users, photos, profile pages (or content of profile pages), etc.) that satisfy or otherwise match the query commands. As an example and not by way of limitation, social-networking system 160 may identify particular users stored in the users vertical P1 who are friends of Tom that worked at Facebook. In particular embodiments, vertical 164 may store objects of a particular object-type. As an example and not by way of limitation, the object-types stored by a vertical may be a user, a photo, a post, a webpage, an application, a location, a user group, or another suitable object-type. In particular embodiments, social-networking system 160 may use one or more string-matching algorithms to attempt to match the one or more n-grams with a string of characters associated with each of one or more of the objects. As an example and not by way of limitation, social-networking system 160 may match text query "friends london" with photos of London stored in photos vertical P3 taken by friends of the user or users stored in user vertical P1 that live in London. In particular embodiments, as described previously, when social-networking system 160 retrieves objects from a vertical 164 in response to a query (or a particular query constraint), the objects may be retrieved based on a static-score or static-rank of the indexed objects. Although this disclosure describes searching particular verticals in a particular manner, this disclosure contemplates searching any suitable verticals in any suitable manner.

Figure 6:
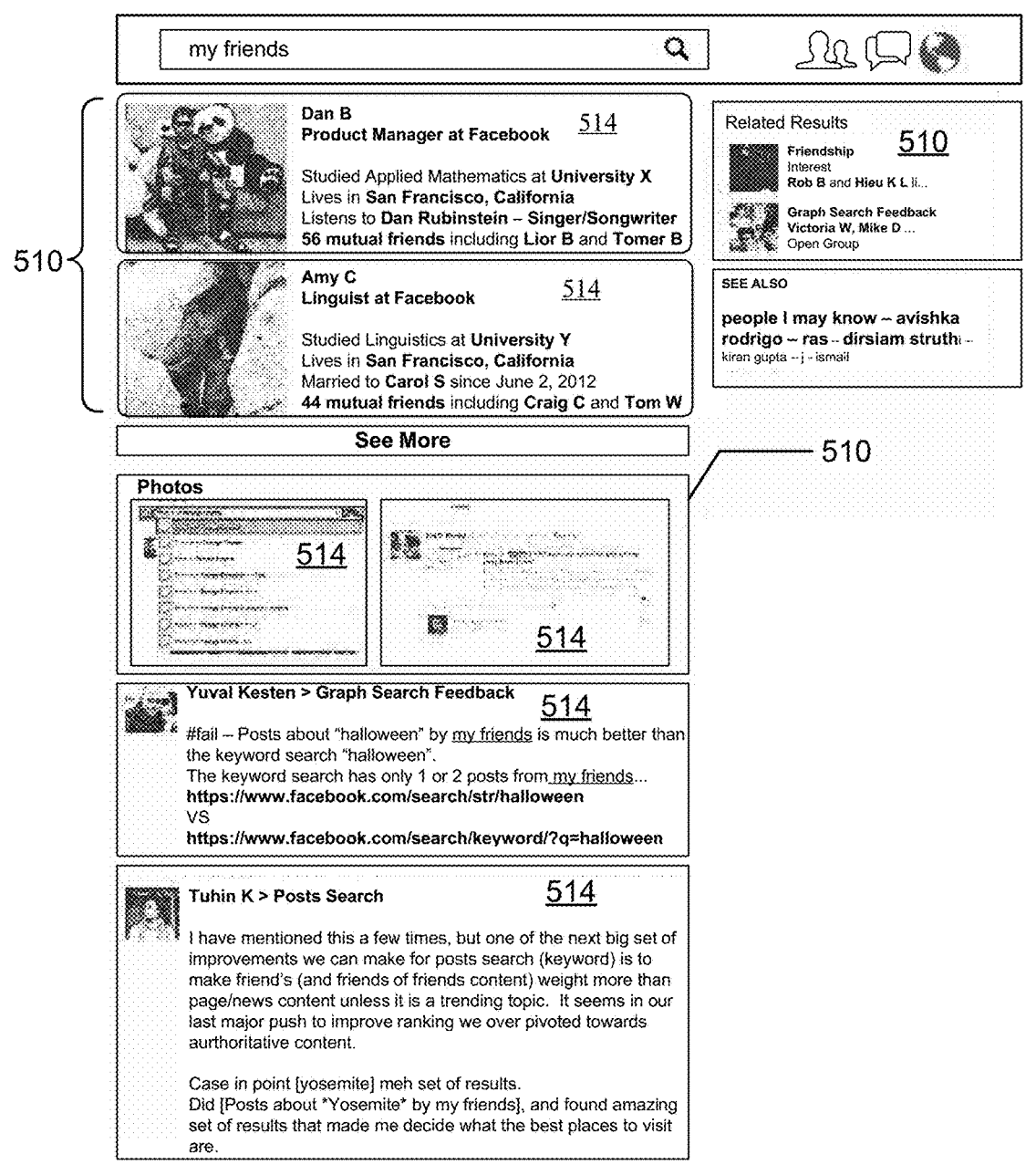

FIGS. 5-6 illustrate an example search results page of an online social network. As illustrated in the example of FIGS. 5-6, a plurality of search-results modules 510 comprising search results 514 of one or more keyword queries or one or more structured queries may be presented to the user. Search results 514 that may include one or more links (e.g., hyperlinks or other activable links), each link being associated with a different page that contains some of the identified resources or content. In particular embodiments, each link may be in the form of a Uniform Resource Locator (URL) that specifies where the corresponding page is located and the mechanism for retrieving it. Furthermore, search results 514 may include snippets of contextual information about the target of the search result, as described above. In particular embodiments, social-networking system 160 may generate a plurality of modules 510. Search results 514 corresponding to one or more identified objects matching the structured queries generated by the sub-request generator may be presented to the user, in the form of modules 510, with each module 510 comprising one or more search results 514 that reference one or more identified object, respectively, stored in verticals 164 described above. As described above, search results 514 of module 510 may include a URL, a snippet, a thumbnail photo, a name or other identifier, another suitable reference, or any combination thereof. The social-networking system 160 may then send the modules 510 to the user's client system 130 (e.g., to a web browser 132 or a native application on client system 130). In particular embodiments, modules 510 may be personalized for the user to include search results referencing specific objects-types based on, for example, social-graph information, user information, search or browsing history of the user, or other suitable information related to the user. In particular embodiments, each module may correspond to a query command of the plurality of query commands generated by the sub-request generator. As an example and not by way of limitation, social-networking system 160 may generate a module 510 called "Top Links" that includes search results 514 related to the text query "putin", as illustrated in the example of FIG. 5, where each search result 514 corresponds to a webpage for a news story about Vladimir Putin.

In particular embodiments, each module 510 may comprise references to one or more of the identified objects matching the query command corresponding to the module 510. As an example and not by way of limitation, modules 510 corresponding to text query "putin" may include search results 514 related to Vladimir Putin, such as for example posts by users of the online social network about Vladimir Putin or pages referencing Vladimir Putin stored in verticals 164. Furthermore, the search-results page may include a module 510 referencing a concept-profile page corresponding to Vladimir Putin, a module 510 corresponding to the structured query "Posts by my friends about Vladimir Putin," and even a user-profile page corresponding to users named "Putin." In particular embodiments, each module 510 may correspond to a structured query comprising references to one or more nodes and one or more edges. The structured query may be based on the query command corresponding to the module. As an example and not by way of limitation, social-networking system 160 may generate a module corresponding to the structured query "Posts by my Friends about Vladimir Putin." In this case, the module 510 corresponding to this structured query would include one or more search results 514 referencing posts corresponding to concept nodes 204 that are connected by a tagged-in-type edge 206 to a concept node 204 corresponding to Vladimir Putin, and also connected by a authored-by edge 206 to user nodes 202 corresponding to first-degree friends of the querying user (i.e. user nodes 202 connected by a friend-type edge 206 to a user node 202 corresponding to the querying user). As another example, social-networking system 160 may generate a module 510 called "Photos" that includes search results 514 related to the text query "my friends", as illustrated in the example of FIG. 6, where each search result 514 corresponds to a photo for suggested friend related search queries or a post by a friend of the user. The structured query may be based on the query command corresponding to the module. As an example and not by way of limitation, social-networking system 160 may present search results 514 that correspond to a structured query "Friends who live in San Francisco". In this case, the module 510 corresponding to this structured query would include one or more search results 514 referencing users corresponding to user nodes 202 that are connected by a live-in-type edge 206 to a concept node 204 corresponding to San Francisco, and also connected by a a friend-type edge 206 to a user node 202 corresponding to the querying user. Although this disclosure describes generating particular modules in a particular manner, this disclosure contemplates generating any suitable modules in any suitable manner.

Figure 7:
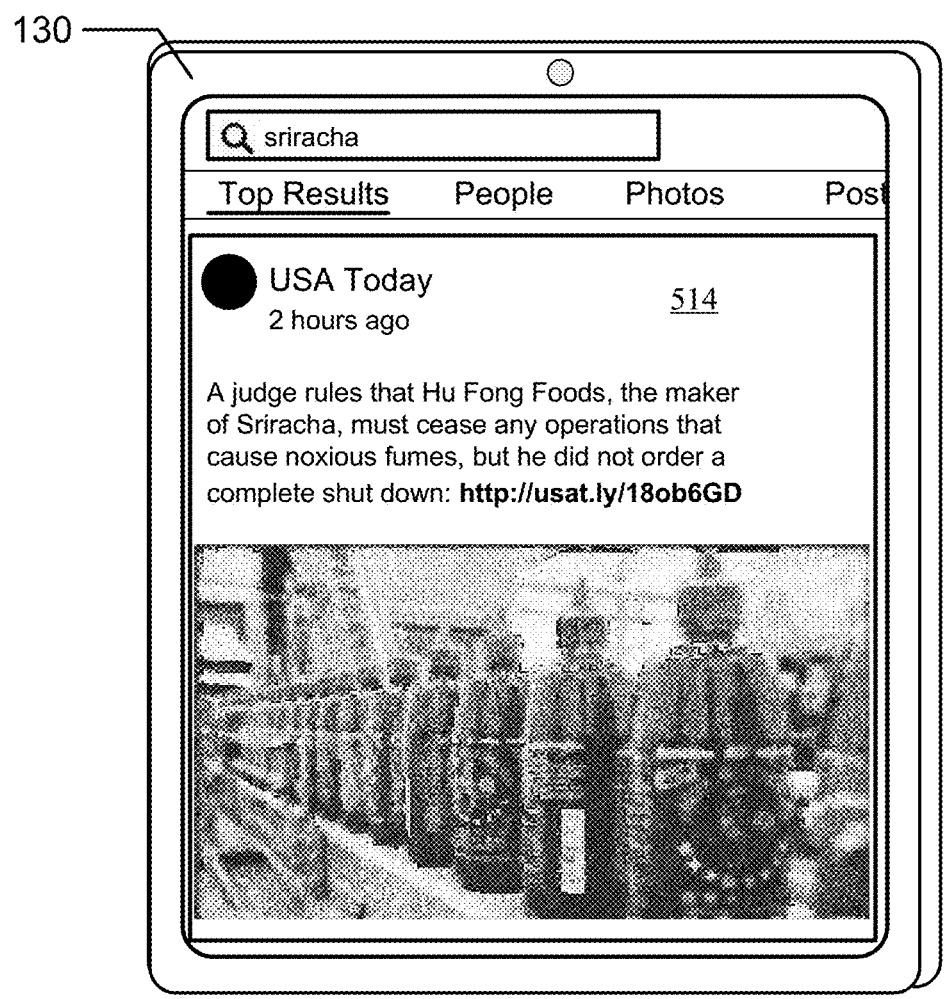
FIGS. 7-9 illustrate an example user interface of a client system displaying various search-results pages.
Figure 8:
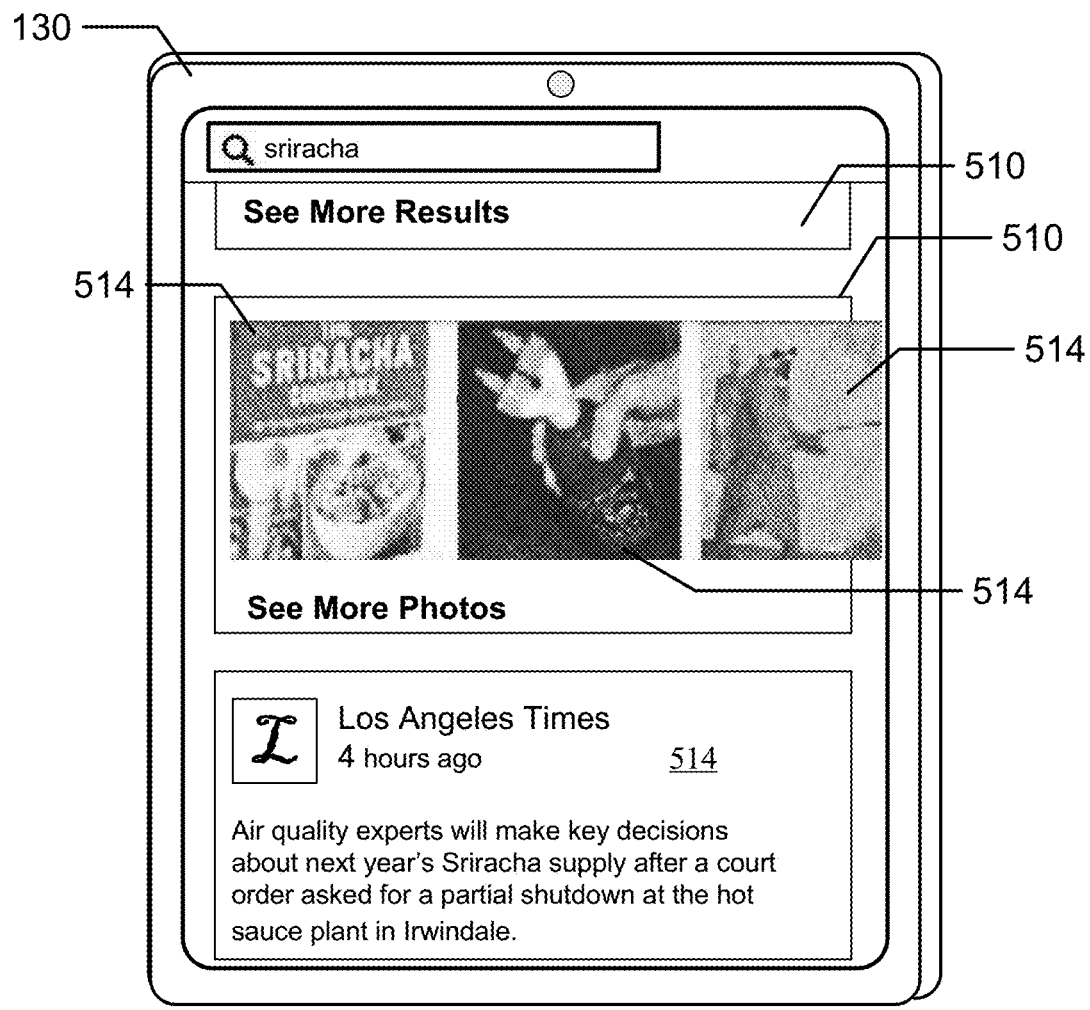
Figure 9:
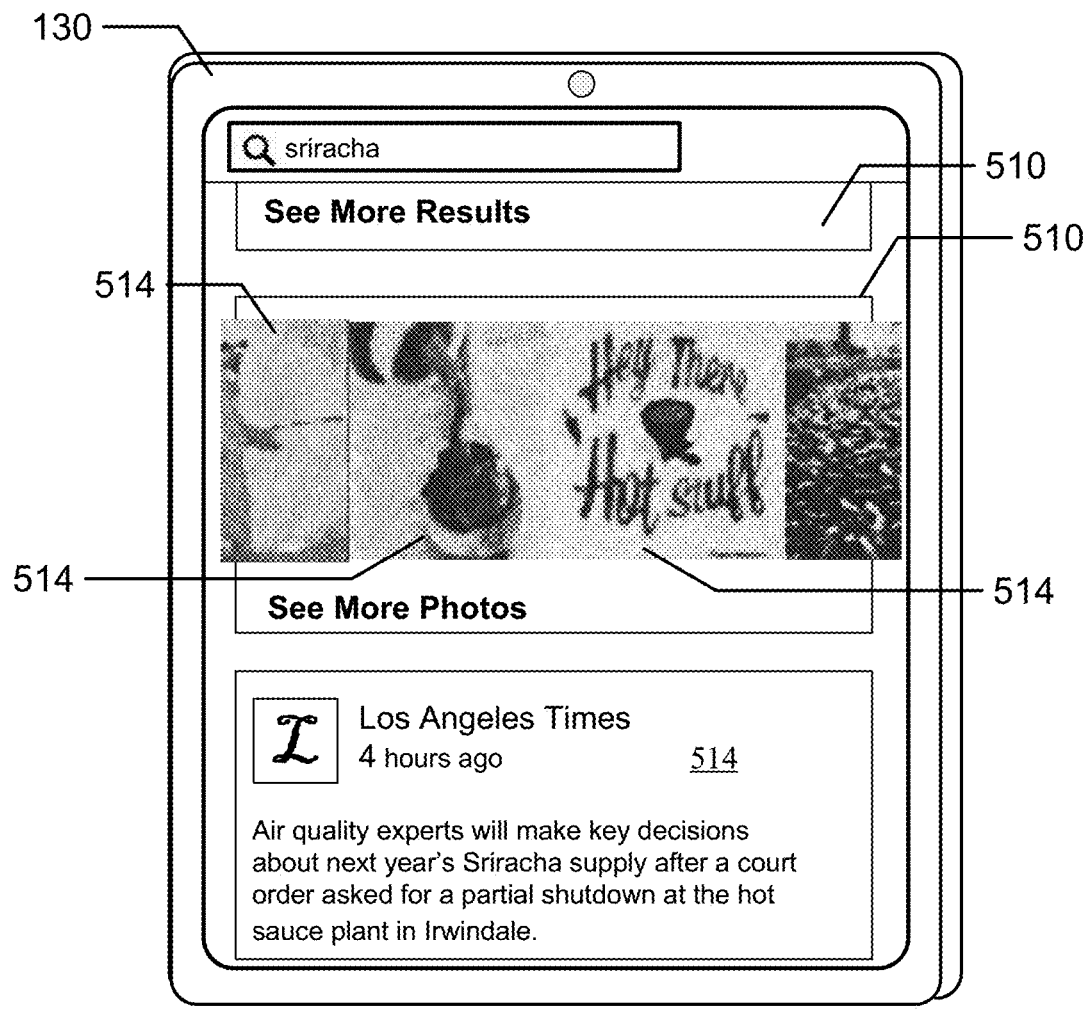

FIGS. 7-9 illustrate an example user interface of a client system 130 displaying various search-results pages. In particular embodiments, social-networking system 160 may score one or more of the generated modules 510. The modules 510 may be scored on a variety of factors, including, for example, relevance to the user (e.g. a classification of the structured query), information of the user, search history of the user, click-through rates (CTR) with search results of modules 510 by users with similar demographic information, etc. In particular embodiments, the sub-request generator may associate a particular score or weighting to each generated structured query that denotes a relative importance or relevance of the structured query. Furthermore, the weighting may be determined globally (e.g. across users of social-networking system 160) or specifically for querying user based on a user profile or other information of the user. In particular embodiments, each of the search results of the structured queries sent to verticals 164 may include an associated relevance score. The associated relevance score may be based on the individual results (e.g. a particular search result 514) of each module 510. As an example and not by way of limitation, if a particular module 510 includes references to one or more high-scoring search results 514, then social-networking system 160 may assign a relatively high score to that module. In particular embodiments, social-networking system 160 may perform inter- and intra-module scoring as if the modules where cards. More information on generating and scoring may be found in U.S. Patent Application No. 61/918,431, filed 19 Dec. 2013, which is incorporated by reference.

In particular embodiments, the relevance score of one or more modules 510 may be modified based on an inferred intent or classification of the search query input provided by the querying user. Classification of a search query input may be performed using a language model (which may be different than the language model of the NLP described above) to perform semantic parsing of the search query input. The search query input may then be classified based at least in part on the results of the semantic parsing. Social-networking system 160 may classify search queries into a variety of classifications, such as, for example, dating, celebrity, travel, local, news, sports, users, product review, other suitable classifications, or any combination thereof. In particular embodiments, social-networking system 160 may score particular search results (or types of search results) higher or lower based on the classification of the search query. As an example and not by way of limitation, search queries classified under the "celebrity" category may more heavily weigh modules 510 that include photos as compared to posts from friends of the user. As another example and not by way of limitation, social-networking system 160 may boost the score of modules 510 that include search results 514 referencing objects stored in user vertical P1 for search query "friend london", where the search query may be classified under the "travel" category indicating the user is looking users of the online social network that he knows in London while travelling. As another example and not by way of limitation, social-networking system 160 may boost the score of modules 510 that include search results 514 reference objects stored in posts vertical P2 for search query "bat kid", where the search query may be classified under a "news" category indicating the user is looking for posts on the online social network that reference Bat Kid. In particular embodiments, classification of the search query input may be further based on information of the user or the user profile of the querying user, and may encompass search results from all verticals 164 associated with the online social network. Although this disclosure describes scoring particular modules in a particular manner, this disclosure contemplates scoring any suitable modules in any suitable manner.

As illustrated in the example of FIGS. 7-9, a UI rendered on client system 130 may present one or more modules 510 that each include one or more search results 514 referencing one or more identified objects, respectively, matching a query associated with the module 510. Higher scoring modules 510 may be sent preferentially to the querying user over lower scoring modules 510. In particular embodiments, the UI may include a filter bar 710 for filtering search results 514 or modules 510 by search-result type or module-type, as described below. The UI may further allow the querying user to navigate through search results 514 and modules 510 through pre-determined input (e.g. touch gesture) provided by the user. In particular embodiments, social-networking system 160 may send each module 510 having a score greater than a threshold score to the first user for display. As illustrated in the example of FIG. 8-9, social-networking system 160 may send a module 510 with one or more search results 514 (e.g. references to photos) in response to receiving search query input "sriracha". As an example and not by way of limitation, social-networking system 160 may generate a module 510 of photos that includes search results 514 related to the text query "sriracha", where each search result 514 corresponds to a photo stored in photos vertical P3 related to sriracha. In particular embodiments, the user may navigate between search results 514 (e.g. thumbnails) of module 510 that includes photos related to sriracha, as illustrated in the example of FIGS. 8-9. In particular embodiments, social-networking system 160 may receive a selection of one of the references from the first user. The social-networking system 160 may then send the object corresponding to the reference to the first user. As an example and not by way of limitation, social-networking system 160 may send a larger sized version of a photo in response to the user selecting one of the thumbnails in module 510. Although this disclosure describes sending particular modules in a particular manner, this disclosure contemplates sending any suitable modules in any suitable manner.

Figure 10:
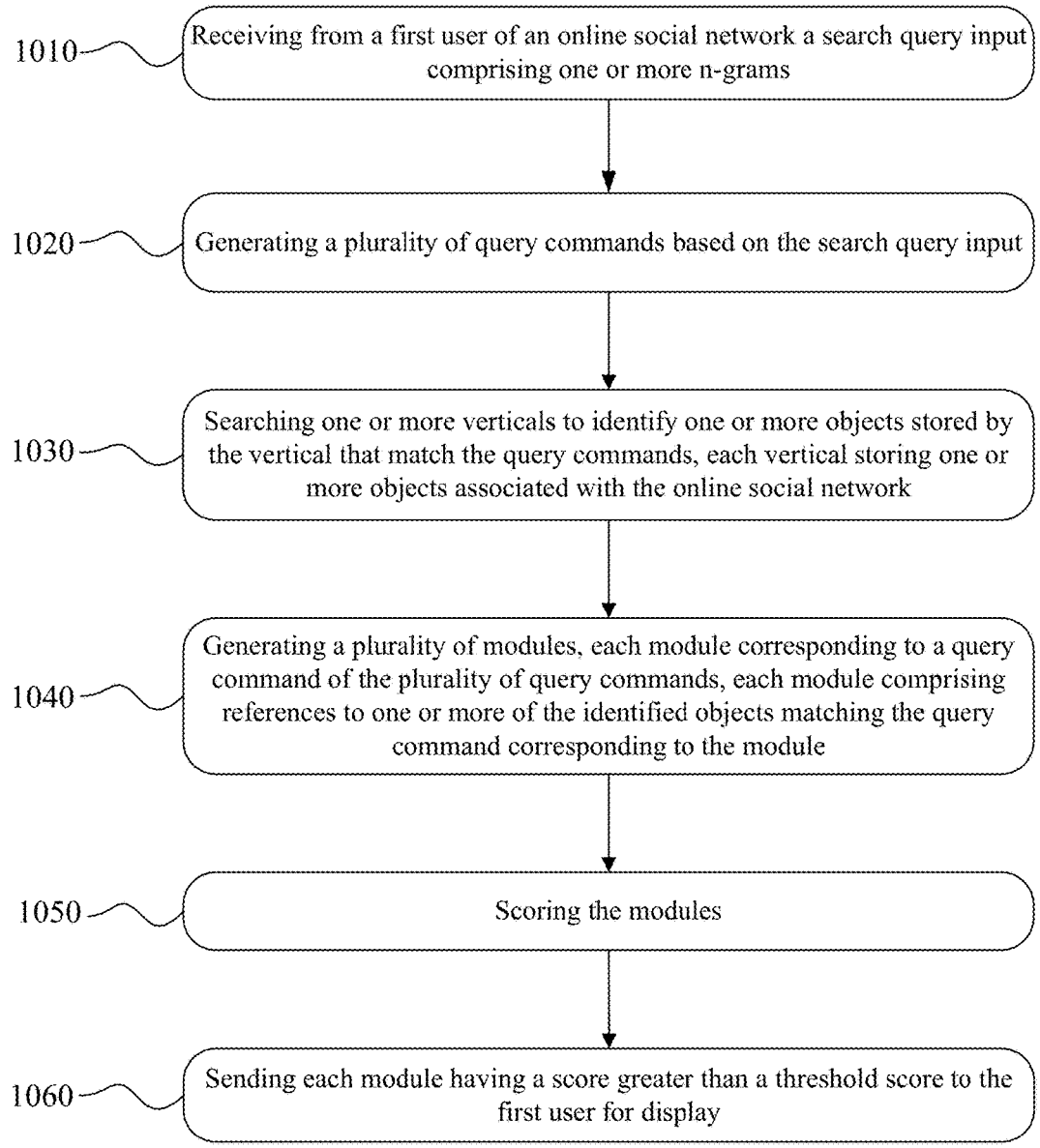
FIG. 10 illustrates an example method for generating and blending search results in response to a query.

FIG. 10 illustrates an example method for generating and blending search results in response to a query. The method may begin at step 1010, where social-networking system 160 may receive from a first user of an online social network a search query input comprising one or more n-grams. At step 1020, social-networking system 160 may generate a plurality of query commands based on the search query input. At step 1030, social-networking system 160 may search one or more verticals to identify one or more objects stored by the vertical that match the query commands. Each vertical may store one or more objects associated with the online social network. At step 1040, social-networking system 160 may generate a plurality of modules. Each module may correspond to a query command of the plurality of query commands. Furthermore, each module may comprise references to one or more of the identified objects matching the query command corresponding to the module. At step 1050, social-networking system 160 may score the modules. At step 1060, social-networking system 160 may send each module having a score greater than a threshold score to the first user for display. Particular embodiments may repeat one or more steps of the method of FIG. 10, where appropriate. Although this disclosure describes and illustrates particular steps of the method of FIG. 10 as occurring in a particular order, this disclosure contemplates any suitable steps of the method of FIG. 10 occurring in any suitable order. Moreover, although this disclosure describes and illustrates an example method for generating and blending search results in response to a query including the particular steps of the method of FIG. 10, this disclosure contemplates any suitable method for generating and blending search results in response to a query including any suitable steps, which may include all, some, or none of the steps of the method of FIG. 10, where appropriate. Furthermore, although this disclosure describes and illustrates particular components, devices, or systems carrying out particular steps of the method of FIG. 10, this disclosure contemplates any suitable combination of any suitable components, devices, or systems carrying out any suitable steps of the method of FIG. 10.

Figure 11:
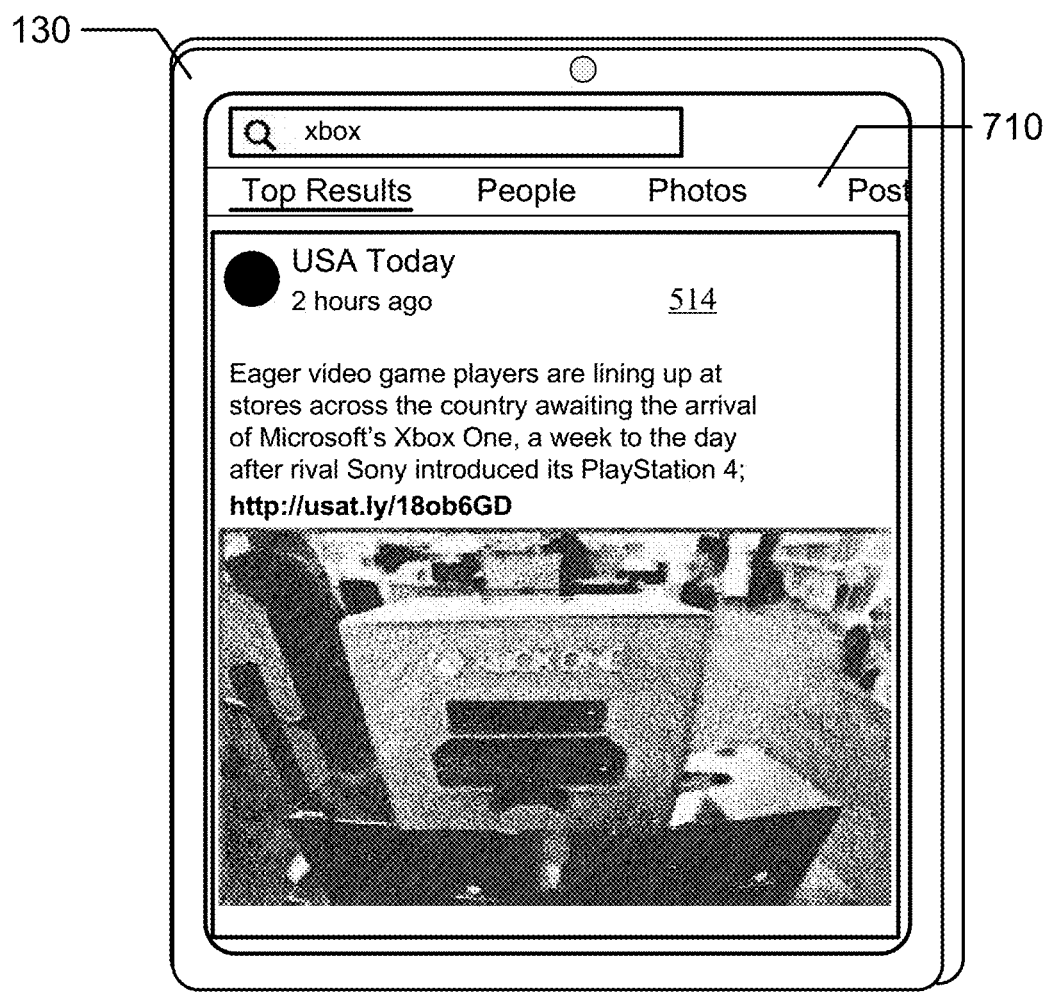
FIGS. 11-12 illustrate an example user interface of a client system displaying various search-results pages.
Figure 12:
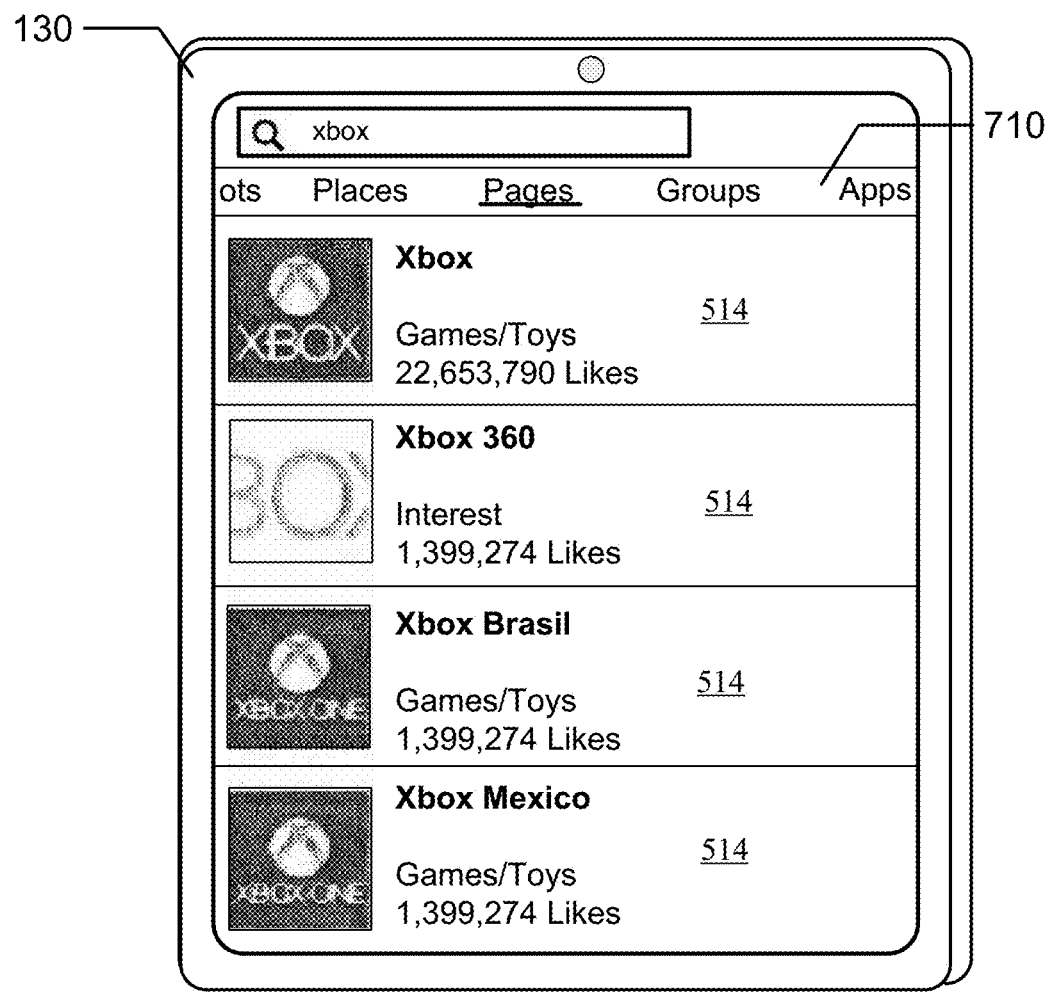

FIGS. 11-12 illustrate an example user interface of a client system 130 displaying various search-results pages. In particular embodiments, the UI may include a filter bar 710 for filtering search results 514 or modules 510 by search-result type or module-type. As an example and not by way of limitation, social-networking system 160 may send search results 514 related to the text query "xbox", as illustrated in the example of FIG. 11, where each search result 514 corresponds to a webpage for a news story about the Xbox. In particular embodiments, the user may navigate to other search results through filter bar 710. As an example and not by way of limitation, social-networking system 160 may send search results 514 related to the text query "xbox", as illustrated in the example of FIG. 12, where each search result 514 corresponds to a webpage related to the Xbox. Furthermore, modules 510 that includes search results 514 may be blended or interleaved with the search results 514 of each category, as described above. Although this disclosure describes filtering particular modules or search results in a particular manner, this disclosure contemplates filtering any suitable modules or search results in any suitable manner.

Systems and Methods

Figure 13:
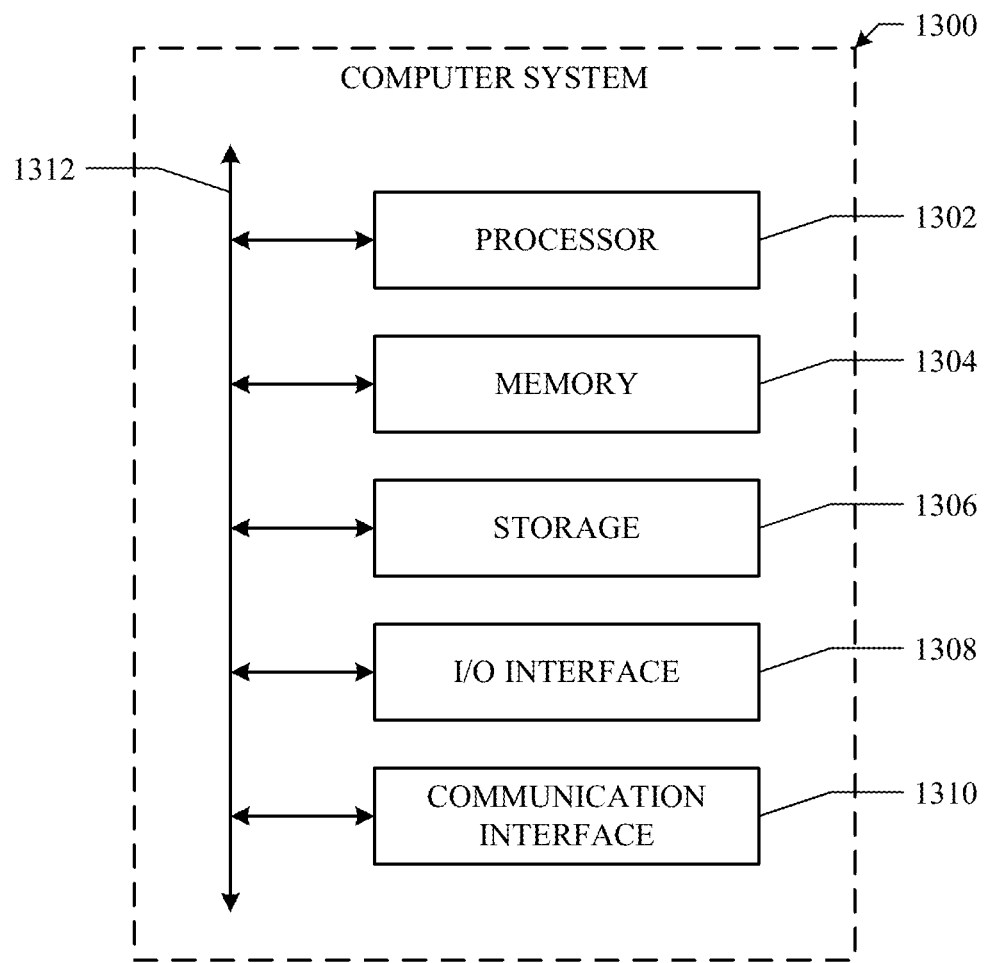
FIG. 13 illustrates an example computer system.

FIG. 13 illustrates an example computer system 1300. In particular embodiments, one or more computer systems 1300 perform one or more steps of one or more methods described or illustrated herein. In particular embodiments, one or more computer systems 1300 provide functionality described or illustrated herein. In particular embodiments, software running on one or more computer systems 1300 performs one or more steps of one or more methods described or illustrated herein or provides functionality described or illustrated herein. Particular embodiments include one or more portions of one or more computer systems 1300. Herein, reference to a computer system may encompass a computing device, and vice versa, where appropriate. Moreover, reference to a computer system may encompass one or more computer systems, where appropriate.

This disclosure contemplates any suitable number of computer systems 1300. This disclosure contemplates computer system 1300 taking any suitable physical form. As example and not by way of limitation, computer system 1300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1300 may include one or more computer systems 1300; be unitary or distributed; span multiple locations; span multiple machines; span multiple data centers; or reside in a cloud, which may include one or more cloud components in one or more networks. Where appropriate, one or more computer systems 1300 may perform without substantial spatial or temporal limitation one or more steps of one or more methods described or illustrated herein. As an example and not by way of limitation, one or more computer systems 1300 may perform in real time or in batch mode one or more steps of one or more methods described or illustrated herein. One or more computer systems 1300 may perform at different times or at different locations one or more steps of one or more methods described or illustrated herein, where appropriate.

In particular embodiments, computer system 1300 includes a processor 1302, memory 1304, storage 1306, an input/output (I/O) interface 1308, a communication interface 1310, and a bus 1312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1302 includes hardware for executing instructions, such as those making up a computer program. As an example and not by way of limitation, to execute instructions, processor 1302 may retrieve (or fetch) the instructions from an internal register, an internal cache, memory 1304, or storage 1306; decode and execute them; and then write one or more results to an internal register, an internal cache, memory 1304, or storage 1306. In particular embodiments, processor 1302 may include one or more internal caches for data, instructions, or addresses. This disclosure contemplates processor 1302 including any suitable number of any suitable internal caches, where appropriate. As an example and not by way of limitation, processor 1302 may include one or more instruction caches, one or more data caches, and one or more translation lookaside buffers (TLBs). Instructions in the instruction caches may be copies of instructions in memory 1304 or storage 1306, and the instruction caches may speed up retrieval of those instructions by processor 1302. Data in the data caches may be copies of data in memory 1304 or storage 1306 for instructions executing at processor 1302 to operate on; the results of previous instructions executed at processor 1302 for access by subsequent instructions executing at processor 1302 or for writing to memory 1304 or storage 1306; or other suitable data. The data caches may speed up read or write operations by processor 1302. The TLBs may speed up virtual-address translation for processor 1302. In particular embodiments, processor 1302 may include one or more internal registers for data, instructions, or addresses. This disclosure contemplates processor 1302 including any suitable number of any suitable internal registers, where appropriate. Where appropriate, processor 1302 may include one or more arithmetic logic units (ALUs); be a multi-core processor; or include one or more processors 1302. Although this disclosure describes and illustrates a particular processor, this disclosure contemplates any suitable processor.

In particular embodiments, memory 1304 includes main memory for storing instructions for processor 1302 to execute or data for processor 1302 to operate on. As an example and not by way of limitation, computer system 1300 may load instructions from storage 1306 or another source (such as, for example, another computer system 1300) to memory 1304. Processor 1302 may then load the instructions from memory 1304 to an internal register or internal cache. To execute the instructions, processor 1302 may retrieve the instructions from the internal register or internal cache and decode them. During or after execution of the instructions, processor 1302 may write one or more results (which may be intermediate or final results) to the internal register or internal cache. Processor 1302 may then write one or more of those results to memory 1304. In particular embodiments, processor 1302 executes only instructions in one or more internal registers or internal caches or in memory 1304 (as opposed to storage 1306 or elsewhere) and operates only on data in one or more internal registers or internal caches or in memory 1304 (as opposed to storage 1306 or elsewhere). One or more memory buses (which may each include an address bus and a data bus) may couple processor 1302 to memory 1304. Bus 1312 may include one or more memory buses, as described below. In particular embodiments, one or more memory management units (MMUs) reside between processor 1302 and memory 1304 and facilitate accesses to memory 1304 requested by processor 1302. In particular embodiments, memory 1304 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1304 may include one or more memories 1304, where appropriate. Although this disclosure describes and illustrates particular memory, this disclosure contemplates any suitable memory.

In particular embodiments, storage 1306 includes mass storage for data or instructions. As an example and not by way of limitation, storage 1306 may include a hard disk drive (HDD), a floppy disk drive, flash memory, an optical disc, a magneto-optical disc, magnetic tape, or a Universal Serial Bus (USB) drive or a combination of two or more of these. Storage 1306 may include removable or non-removable (or fixed) media, where appropriate. Storage 1306 may be internal or external to computer system 1300, where appropriate. In particular embodiments, storage 1306 is non-volatile, solid-state memory. In particular embodiments, storage 1306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1306 taking any suitable physical form. Storage 1306 may include one or more storage control units facilitating communication between processor 1302 and storage 1306, where appropriate. Where appropriate, storage 1306 may include one or more storages 1306. Although this disclosure describes and illustrates particular storage, this disclosure contemplates any suitable storage.

In particular embodiments, I/O interface 1308 includes hardware, software, or both, providing one or more interfaces for communication between computer system 1300 and one or more I/O devices. Computer system 1300 may include one or more of these I/O devices, where appropriate. One or more of these I/O devices may enable communication between a person and computer system 1300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1308 for them. Where appropriate, I/O interface 1308 may include one or more device or software drivers enabling processor 1302 to drive one or more of these I/O devices. I/O interface 1308 may include one or more I/O interfaces 1308, where appropriate. Although this disclosure describes and illustrates a particular I/O interface, this disclosure contemplates any suitable I/O interface.

In particular embodiments, communication interface 1310 includes hardware, software, or both providing one or more interfaces for communication (such as, for example, packet-based communication) between computer system 1300 and one or more other computer systems 1300 or one or more networks. As an example and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1310 for it. As an example and not by way of limitation, computer system 1300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1300 may include any suitable communication interface 1310 for any of these networks, where appropriate. Communication interface 1310 may include one or more communication interfaces 1310, where appropriate. Although this disclosure describes and illustrates a particular communication interface, this disclosure contemplates any suitable communication interface.

In particular embodiments, bus 1312 includes hardware, software, or both coupling components of computer system 1300 to each other. As an example and not by way of limitation, bus 1312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1312 may include one or more buses 1312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more computing devices:

receiving from a first user of an online social network a search query input comprising one or more n-grams;

generating a plurality of query commands by parsing the search query input, wherein each query command comprises one or more query constraints, each query constraint being a request for a particular object-type to be retrieved from a particular vertical, and wherein each query command is customized for one or more respective verticals;

searching, for each query command of the plurality of query commands, the one or more respective verticals to identify a plurality of objects stored by the vertical that match the respective query command, each vertical storing one or more objects of a particular object-type associated with the online social network;

generating a plurality of search-result modules corresponding to the plurality of query commands, respectively, each search-result module of the plurality of search-result modules comprising references to a plurality of the identified objects matching the query command corresponding to the search-result module;

classifying the search query input, wherein the classification of the search query input is based at least in part on a semantic parsing of the search query input and social-networking information of the first user;

scoring each search-result module of the plurality of search-result modules, wherein scoring the search-result modules comprises, for each search-result module of the plurality of search-result modules:

calculating a score for the search-result module based at least in part on:

a relevance of the search-result module with respect to the classification of the search query input; and a relevance of each identified object referenced in the search-result module with respect to the search query input; and sending each search-result module having a score greater than a threshold score to the first user for display, wherein the search-result modules are displayed in order based on their respective scores.

2. The method of claim 1, wherein scoring the search-result modules comprises, for each search-result module:
calculating a score for each identified object referenced by the search-result module; and
calculating a score for the search-result module based at least in part on the calculated scores of the identified objects referenced by the search-result module.

3. The method of claim 1, wherein classifying the search query input is further based on one or more of the n-grams of the search query input.

4. The method of claim 3, further comprising increasing a score of one or more of the identified objects of a particular object-type based at least in part on the classification of the search query input.

5. The method of claim 3, further comprising decreasing a score of one or more of the identified objects of a particular object-type based at least in part on the classification of the search query input.

6. The method of claim 1, wherein the plurality of query commands are generated by a sub-request generator of the online social network.

7. The method of claim 1, wherein each query constraint is for a specified number of objects of the particular object-type.

8. The method of claim 1, wherein the particular object-type is selected from a group consisting of: a user, a photo, a post, a webpage, an application, a location, or a user group.

9. The method of claim 1, wherein each vertical stores objects of a different object-type.

10. The method of claim 1, further comprising:
accessing a social graph comprising a plurality of nodes and a plurality of edges connecting the nodes, each of the edges between two of the nodes representing a single degree of separation between them, the nodes comprising:
a first node corresponding to the first user; and
a plurality of second nodes that each correspond to a concept or a second user associated with the online social network.

11. The method of claim 10, wherein each search-result module corresponds to a structured query comprising references to one or more nodes and one or more edges, the structured query being based on the query command corresponding to the search-result module.

12. The method of claim 10, wherein each node of the plurality of nodes is associated with a particular object.

13. The method of claim 1, wherein the search query input comprises a user-generated character string received from a client system associated with the first user, and wherein the user-generated character string is entered by the first user in a query field and rendered at the client device as each character of the character string is entered by the user.

14. The method of claim 1, wherein searching the verticals to identify one or more objects stored by the vertical that match the query command comprises using one or more string matching algorithms to attempt to match the one or more n-grams with a string of characters associated with each of one or more of the objects.

15. The method of claim 1, further comprising:
receiving a selection of one of the references from the first user; and
sending the object corresponding to the reference to the first user.

16. The method of claim 1, wherein the score for each search-result module is further based on:
calculating a sub-score for each identified object referenced in the search-result module, wherein the sub-score is based on the relevance of the identified object with respect to the search query input; and
summing the sub-scores of the top N identified objects in the search-result module.

17. The method of claim 1, wherein each search-result module comprises one or more search results corresponding to objects having a particular object-type, the particular object-type being selected from a group consisting of: a user, a photo, a post, a webpage, an application, a location, or a user group.

18. One or more computer-readable non-transitory storage media embodying software that is operable when executed to:
receive from a first user of an online social network a search query input comprising one or more n-grams;
generate a plurality of query commands by parsing the search query input, wherein each query command comprises one or more query constraints, each query constraint being a request for a particular object-type to be retrieved from a particular vertical, and wherein each query command is customized for one or more respective verticals;
search, for each query command of the plurality of query commands, the one or more respective verticals to identify a plurality of objects stored by the vertical that match the respective query command, each vertical storing one or more objects of a particular object-type associated with the online social network;
generate a plurality of search-result modules corresponding to the plurality of query commands, respectively, each search-result module of the plurality of search-result modules comprising references to a plurality of the identified objects matching the query command corresponding to the search-result module;
classify the search query input, wherein the classification of the search query input is based at least in part on a semantic parsing of the search query input and social-networking information of the first user;
score each search-result module of the plurality of search-result modules, wherein scoring the search-result modules comprises, for each search-result module of the plurality of search-result modules:
calculating a score for the search-result module based at least in part on:
a relevance of the search-result module with respect to the classification of the search query input; and
a relevance of each identified object referenced in the search-result module with respect to the search query input; and
send each search-result module having a score greater than a threshold score to the first user for display, wherein the search-result modules are displayed in order based on their respective scores.

19. A system comprising: one or more processors; and a memory coupled to the processors comprising instructions executable by the processors, the processors operable when executing the instructions to:
receive from a first user of an online social network a search query input comprising one or more n-grams;
generate a plurality of query commands by parsing the search query input, wherein each query command comprises one or more query constraints, each query constraint being a request for a particular object-type to be retrieved from a particular vertical, and wherein each query command is customized for one or more respective verticals;

search, for each query command of the plurality of query commands, the one or more respective verticals to identify a plurality of objects stored by the vertical that match the respective query command, each vertical storing one or more objects of a particular object-type associated with the online social network;

generate a plurality of search-result modules corresponding to the plurality of query commands, respectively, each search-result module of the plurality of search-result modules comprising references to a plurality of the identified objects matching the query command corresponding to the search-result module;

classify the search query input, wherein the classification of the search query input is based at least in part on a semantic parsing of the search query input and social-networking information of the first user;

score each search-result module of the plurality of search-result modules, wherein scoring the search-result modules comprises, for each search-result module of the plurality of search-result modules:
- calculating a score for the search-result module based at least in part on:
  - a relevance of the search-result module with respect to the classification of the search query input; and
  - a relevance of each identified object referenced in the search-result module with respect to the search query input; and send each search-result module having a score greater than a threshold score to the first user for display, wherein the search-result modules are displayed in order based on their respective scores.

\* \* \* \* \*